(12) United States Patent
Carlson et al.

(10) Patent No.: US 9,639,714 B1
(45) Date of Patent: May 2, 2017

(54) SECURE TRANSMISSION OF SENSITIVE DATA

(71) Applicant: Charter Communications Operating, LLC, St. Louis, MO (US)

(72) Inventors: Jay Eric Carlson, Weldon Springs, MO (US); Rodney Allen Copeland, Chesterfield, MO (US); Michael David Hanrahan, Chesterfield, MO (US); Christopher Scott Alcott, Manchester, MO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 15/288,297

(22) Filed: Oct. 7, 2016

Related U.S. Application Data

(60) Provisional application No. 62/342,491, filed on May 27, 2016, provisional application No. 62/342,490, filed on May 27, 2016.

(51) Int. Cl.
*H04L 29/06* (2006.01)
*G06F 21/62* (2013.01)
*G06F 21/60* (2013.01)

(52) U.S. Cl.
CPC ........ *G06F 21/6218* (2013.01); *G06F 21/606* (2013.01); *H04L 63/02* (2013.01); *H04L 63/0428* (2013.01)

(58) Field of Classification Search
CPC ... G06F 21/6218; G06F 21/606; H04L 63/02; H04L 63/0428

(Continued)

(56) References Cited

U.S. PATENT DOCUMENTS 6,970,886 B1 * 11/2005 Conwell ........... G06F 17/30749
8,464,311 B2 * 6/2013 Ashley ................ H04L 63/0823
713/168

(Continued)

FOREIGN PATENT DOCUMENTS

WO   WO-2012/000092 A1   1/2012
WO   WO-2016/064888 A1   4/2016

OTHER PUBLICATIONS

Search Report and Written Opinion in International Application No. PCT/US2016/055974 dated Dec. 2, 2016, 16 pages.

*Primary Examiner* — Michael S McNally
(74) *Attorney, Agent, or Firm* — Marshall, Gerstein & Borun LLP

(57) ABSTRACT

In a method for providing secure communication of a data string along a communication path, a first entity and first identifier, and a second entity and second identifier, are added to a registry database. A current value of the first identifier is provided to a first device to enable a first encoding of the data string, where the first encoding encodes a plurality of bit sequences in the data string as a first plurality of encoded bit sequences. A current value of the second identifier is provided to a second device downstream of the first device to enable a second encoding of the data string, where the second encoding encodes the first plurality of encoded bit sequences as a second plurality of encoded bit sequences. The current values of the first and second identifiers are provided to a third (e.g., destination) device to enable decoding of the data string.

20 Claims, 10 Drawing Sheets

(58) Field of Classification Search
USPC .......................................................... 726/27
See application file for complete search history.

(56) References Cited

U.S. PATENT DOCUMENTS

| | | | | |
|---|---|---|---|---|
| 8,826,455 | B2 * | 9/2014 | Julisch | .................. G06F 21/604 |
| | | | | 726/16 |
| 2008/0114884 | A1 * | 5/2008 | Hewes | .................. H04L 12/585 |
| | | | | 709/229 |
| 2012/0254386 | A1 * | 10/2012 | Smith | ............... H04L 29/12066 |
| | | | | 709/223 |
| 2013/0305345 | A1 * | 11/2013 | Bugenhagen | ......... H04L 63/101 |
| | | | | 726/12 |
| 2014/0177825 | A1 | | 6/2014 | Mattsson et al. |
| 2015/0007265 | A1 | | 1/2015 | Aissi et al. |
| 2016/0063269 | A1 | | 3/2016 | Liden et al. |

\* cited by examiner

SECURE TRANSMISSION OF SENSITIVE DATA

CROSS-REFERENCE TO RELATED APPLICATIONS

This claims the benefit of U.S. Provisional Patent Application No. 62/342,490, filed on May 27, 2016 and entitled "Secure Collection of Sensitive Data," and of U.S. Provisional Patent Application No. 62/342,491, filed on May 27, 2016 and entitled "Secure Transmission of Sensitive Data," the disclosures of which are hereby incorporated herein by reference in their entireties.

TECHNICAL FIELD

The present disclosure relates to data security. In particular, the disclosure relates to systems and methods for securely collecting, sending and/or storing sensitive (e.g., confidential) or potentially sensitive data.

BACKGROUND

Currently, many different encoding techniques are designed to prevent unauthorized access to communicated and/or stored data. However, these techniques are associated with various drawbacks. For example, these techniques generally do not protect or obfuscate sensitive data in a manner that is end-to-end (e.g., starting the moment that information is manually entered by an individual using a keypad). Moreover, some use a generalized approach where, if the code is "cracked" with respect to one transmission, the code may also be compromised for future transmissions and/or with respect to transmissions between other parties or devices. Still further, some do not provide the flexibility to tailor the level of security to different entities (e.g., different companies, people, devices, etc.), or the flexibility to respond to security threats (e.g., data breaches) in a precise or focused way.

SUMMARY

In one embodiment, a method of providing secure communication of a data string along a communication path including a plurality of devices is implemented in a server that includes one or more processors and a memory storing a registry database. The method includes adding to the registry database a first entity and a first identifier associated with the first entity, adding to the registry database a second entity and a second identifier associated with the second entity, and providing to a first device of the plurality of devices, via a first secure communication channel, a first current value of the first identifier to enable a first encoding of the data string. The first device is associated with the first entity, and the first encoding of the data string encodes a plurality of bit sequences in the data string as a first plurality of encoded bit sequences. The method also includes providing to a second device of the plurality of devices, via a second secure communication channel, a first current value of the second identifier to enable a second encoding of the data string. The second device is associated with the second entity and downstream of the first device in the communication path, and the second encoding of the data string encodes the first plurality of encoded bit sequences as a second plurality of encoded bit sequences. The method also includes providing to a third device of the plurality of devices, via a third secure communication channel, the first current value of the first identifier and the first current value of the second identifier to enable decoding of the data string. The third device is downstream of the second device in the communication path.

In another embodiment, a method of providing secure communication of a data string is implemented in a server that includes one or more processors and a memory storing a registry database. The method includes adding to the registry database a first entity and a first identifier associated with the first entity, adding to the registry database a second entity and a second identifier associated with the second entity, providing to a source device associated with the first entity and the second entity, via a first secure communication channel, both (i) a first current value of the first identifier to enable a first encoding of the data string, wherein the first encoding of the data string encodes a plurality of bit sequences in the data string as a first plurality of encoded bit sequences, and (ii) a first current value of the second identifier to enable a second encoding of the data string, wherein the second encoding of data string encodes the first plurality of encoded bit sequences as a second plurality of encoded bit sequences. The method also includes providing to a destination device, via a second secure communication channel, the first current value of the first identifier and the first current value of the second identifier to enable decoding of the data string.

In another embodiment, a method, implemented in an electronic device having one or more processors, a communication interface, and a memory, includes obtaining, by the one or more processors, an encoded data string, and receiving, by the one or more processors via the communication interface and a secure communication channel, current values of N identifiers from a remote server. Each of the N identifiers (i) is associated with a respective one of a plurality of entities, each of the plurality of entities being associated with communication of the encoded data string, and (ii) corresponds to a respective one of N decoding operations. Each of the N decoding operations operates on blocks of bits having a respective block size, and N is an integer greater than 1. The method also includes determining, by the one or more processors, a sequence in which the N decoding operations are to be applied to the encoded data string, and generating, by the one or more processors, a decoded data string by performing the N decoding operations on the encoded data string according to the determined sequence. Performing the N decoding operations includes, for each decoding operation of the N decoding operations, (i) parsing at least a portion of the encoded data string, or at least a portion of a partially decoded data string resulting from a previous one of the N decoding operations, into blocks having the respective block size, (ii) separately decoding each of the blocks having the respective block size, and (iii) for the first N−1 decoding operations, passing a string of the separately decoded blocks to the next one of the N decoding operations. The method also includes causing, by the one or more processors, the decoded data string to be one or both of (i) stored in the memory and (ii) transmitted to another device.

In another embodiment, a server includes a first memory storing a registry database, a second memory storing instructions, and one or more processors. The one or more processors are configured to execute the instructions to add to the registry database a first entity and a first identifier associated with the first entity, add to the registry database a second entity and a second identifier associated with the second entity, and provide to a first device of a plurality of devices in a communication path for a data string, via a first secure communication channel, a first current value of the first identifier to enable a first encoding of the data string. The first device is associated with the first entity, and the first encoding of the data string encodes a plurality of bit sequences in the data string as a first plurality of encoded bit sequences. The one or more processors are also configured to provide to a second device of the plurality of devices, via a second secure communication channel, a first current value of the second identifier to enable a second encoding of the data string. The second device is associated with the second entity and downstream of the first device in the communication path, and the second encoding of the data string encodes the first plurality of encoded bit sequences as a second plurality of encoded bit sequences. The one or more processors are also configured to provide to a third device of the plurality of devices, via a third secure communication channel, the first current value of the first identifier and the first current value of the second identifier to enable decoding of the data string. The third device is downstream of the second device in the communication path.

DETAILED DESCRIPTION

Figure 1:
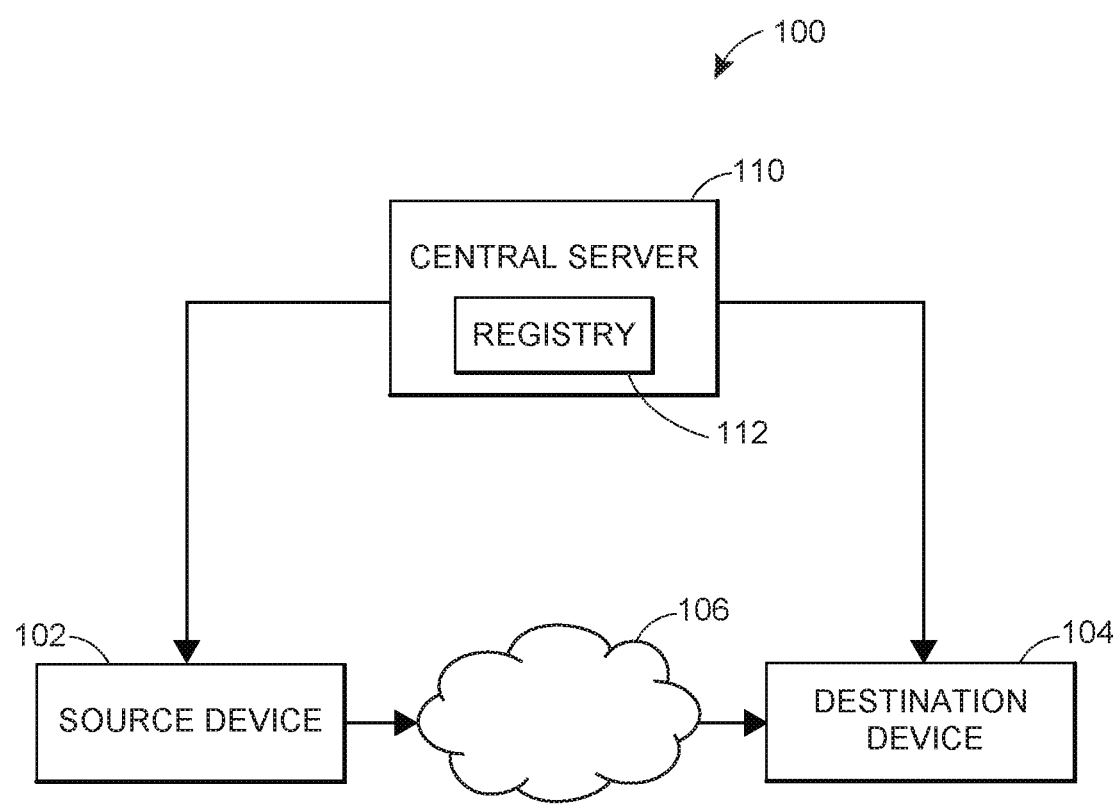
FIG. 1 is a block diagram of an example system in which aspects of the present disclosure may be implemented, according to one embodiment.

Various aspects of the present disclosure provide systems and methods for obfuscating sensitive or potentially sensitive data (e.g., credit card or other financial information, health information, passwords, social security numbers, etc.) during the course of a transaction. As used herein, a "transaction" may refer to any interaction or operation that involves entering, collecting and/or communicating information. Thus, for example, one transaction may involve an employee of a retailer entering a customer's credit card number on a keypad (e.g., a smartphone or tablet touchscreen, or a hardware keypad, etc.), and transmitting encoded information corresponding to the credit card number to a payment provider (or storing the encoded information in a local database, etc.). As another example, a transaction may involve a patient entering answers to a medical survey or questionnaire on a keyboard, and transmitting encoded information corresponding to the patient's answers to a remote server. As yet another example, a transaction may involve an administrative employee of a company sending confidential accounting records to another employee or department within the company. Of course, countless other types of transactions involving sensitive or potentially sensitive information are also possible.

Some aspects of the present disclosure may require pre-registering various entities with a coordinating body. As used herein, an "entity" may be any physical or virtual thing that can be directly or tangentially involved in a transaction, such as a company or institution (e.g., retailer, hospital, bank, credit card company, government agency, etc.), a department, a person (e.g., a particular customer, a particular employee or agent, etc.), a specific credit or debit card, a software application, a router, a network switch, a firewall, and so on. Once a particular entity is registered, a central server may maintain an identifier, or a number of identifiers, associated with that entity in a registry. As will be discussed in greater detail below, the value of each identifier may correspond to a particular encoding/decoding scheme. For example, one encoding scheme may encode data strings by parsing the data string into blocks of 32 bits, and using a predetermined mapping to encode each 32-bit block into a new 32-bit block. A different encoding scheme may encode data strings by parsing the data string into blocks of 8 bits, and using a predetermined mapping to encode each 8-bit block into a new 16-bit block, and so on. Each encoding scheme may perform a wholly predetermined mapping of bit sequences, or may be more complex (e.g., by using the current time to further randomize the encoded bit sequence, etc.). To decrease the risk of an identifier being discovered by an unauthorized party, the central server may change the values of the identifiers stored in the registry from time to time (e.g., periodically, and/or upon request).

Some aspects of the present disclosure allow sensitive data to be obfuscated the moment the data is manually entered using a physical or virtual keypad interface of an electronic device. Generally, this may be accomplished by mapping each key entry to a coordinate in a virtual space. The virtual space coordinates, rather than other, more easily ascertained representations of the key entries (e.g., ASCII symbols), may then be stored, further processed, transmitted, etc. The mapping of each key entry to a virtual space coordinate may be dictated, at any given time, by the current value of an identifier of a registered entity that is associated with the transaction in some way (e.g., a company, an agent/employee, a keypad device, etc.). In some embodiments and scenarios, multiple identifiers (e.g., 2, 5, 10, 100, etc.), corresponding to multiple mapping layers, may be used to further obfuscate a user's key entry information. The identifiers may include identifiers of multiple entities (e.g., one for a company, one for an agent entering the information, etc.), and/or multiple identifiers of a single entity. The electronic device may request the appropriate identifier(s) from the central server as needed via a secure communication channel (e.g., using state of the art encryption and authentication techniques), for example. As noted above, the central server may change/update each identifier on any desired basis. If multiple identifiers are used, for example, one or more of those identifiers may be changed with sufficient frequency that the corresponding mapping(s) change from one key entry to the next.

More generally, a number of encoder stages may be sequentially applied to encode a data string being communicated during a transaction. In the above description pertaining to the obfuscation of key entry information, for example, each "layer" (i.e., each mapping to a different set of virtual coordinates) may correspond to a particular encoding stage. In some embodiments and scenarios, however, at least some encoding stages are applied by other devices in the communication path. For example, a first set of four encoding stages may be sequentially applied by an electronic device that was initially used to enter information, a fifth encoding stage may be applied by a router in the communication path (e.g., using an identifier for the router) and a sixth encoding stage may then be applied by a network server downstream of the router in the communication path (e.g., using an identifier for a firewall implemented by the server), etc.

Each encoding stage in the sequence may correspond to a specific output block size. For example, an encoding stage with an output block size of 16 may parse an input data string into input blocks of 16 bits each, and then encode those input blocks to generate 16-bits output blocks. Generally, different encoding stages may have different output block sizes, and the input block sizes need not (but may) match the output block sizes. Preferably, however, the output block size is at least as large as the input block size in order to avoid potential collisions (i.e., scenarios where two different bit sequences are mapped to the same output bit sequence).

To decode the data string (e.g., at an electronic device of an entity receiving the communication), the inverse operation of each encoding stage is applied. Moreover, to properly decode the data string, the decoding stages are applied in the reverse order relative to the corresponding encoding stages. For example, the inverse operation of the last encoding stage is used as the first decoding stage, and the inverse operation of the first encoding stage is used as the last decoding stage. If the encoding process included mapping key entries to virtual space coordinate as an initial stage, the receiver of the encoded data string may reverse that encoding process in the final decoding stage to arrive at the originally entered/typed data.

To determine the appropriate decoding operations, the electronic device receiving the encoded data string may request, or otherwise obtain, the appropriate identifier values from the central server via a secure communication channel (e.g., using state of the art encryption and authentication techniques). The central server may also send the receiving device information pertaining to the sequence in which the different decoding operations are to occur. In other embodiments, the receiving device knows the sequence a priori, and only obtains the current identifier values from the central server.

These and other aspects of the present disclosure will be apparent from the description that follows.

I. Exemplary System

Exemplary components that may implement various aspects of the invention will first be described in connection with FIGS. 1 and 2. Referring first to FIG. 1, an example system 100 corresponds to a scenario in which sensitive or potentially sensitive information is transmitted from a source device 102 to a destination device 104 via a network 106. Generally, the source device 102 may be any suitable type of electronic device that enables data entry and can transmit data (e.g., a dedicated keypad device, a smartphone, a tablet, a laptop computer, a desktop computer, etc.), the destination device 104 may be any suitable type of electronic device that can receive data and enables data storage, processing and/or forwarding/transmission (e.g., a server), and the network 106 may be any suitable communication network or combination of communication networks, such as one or more local area networks (LANs), one or more wide area networks (WANs), etc. The environment 100 also includes a central server 110 that maintains a registry 112 of various entities. The registry 112 may include a database stored in one or more persistent memories of the central server 110, for example.

Figure 2:
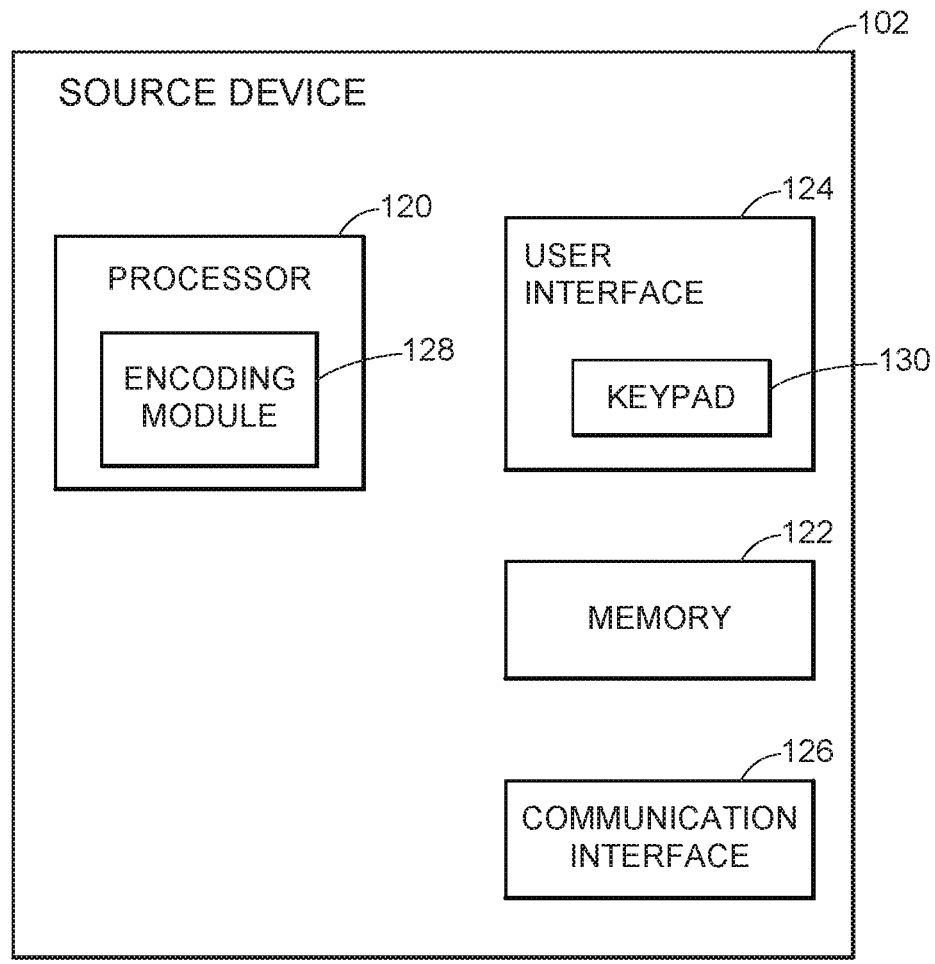
FIG. 2 is a block diagram of an example source device, according to one embodiment.

FIG. 2 is a more detailed, though still simplified, block diagram of the source device 102 of FIG. 1, according to one embodiment. The source device 102 may be a dedicated device (e.g., a dedicated tablet or hardware keypad device), or a general-purpose device (e.g., a laptop, desktop, smartphone, tablet, etc.). As seen in FIG. 2, the source device 102 includes a processor 120, a memory 122, a user interface 124, and a communication interface 126. While FIG. 2 shows each of these components within the single box labeled 102, it is understood that the components may be distributed among multiple housings and/or devices.

The processor 120 may be a single processor or include multiple processors (e.g., a CPU and a GPU), and may execute instructions (e.g., stored in memory 122) to perform the various operations of source device 102 described below. For example, the processor 120 may execute an encoding module 128 to perform the various encoding operations described below. The memory 122 may include one or more persistent memories, such as a read-only memory (ROM), and one or more non-persistent memories, such as a random access memory (RAM).

The user interface 124 presents a physical or virtual keypad 130. For example, the user interface 124 may include a hardware keypad with a number of physical keys, as well as any underlying hardware and/or firmware (e.g., contacts, switches, etc.) needed to sense key entries. Alternatively, the user interface 124 may include a touchscreen display, along with any supporting hardware and/or firmware (e.g., a touch sensor integrated circuit), and the keypad 130 may be a virtual keypad displayed on the touchscreen. The keys may correspond to numbers, letters, special characters (e.g., a period, comma, ampersand, etc.), and/or other symbols. The keypad 130 may include keys similar to a QWERTY keyboard, for example.

In some embodiments, the user interface 124 also includes a display screen and/or one or more other (e.g., audio) output components. The output component(s) may or may not be integrated with the keypad 130. If the user interface 124 includes a touchscreen, for example, the touchscreen may present both the keypad 130 and any information to be output to the user (e.g., instructions for entering information using keypad 130, confirmations that messages have been sent successfully, etc.). Generally, processor 120 may detect and act upon user inputs made via keypad 130, and may generate information (if any) output to the user via the user interface 124.

The communication interface 126 includes hardware and/or firmware to support one or more communication protocols (e.g., an Ethernet port, a wireless local area network card, and/or one or more other communication ports). In some embodiments, communication interface 126 includes one or more interfaces specifically configured to support highly secure communication protocols (e.g., handshaking, authentication, encryption/decryption, etc.) as well as less secure protocols. For example, communication interface 126 may include a first port for communicating with central server 110 on a dedicated, secure channel, and a second port for communicating with destination device 104 on a general-purpose, less secure channel. Alternatively, a single port may be used for both types of communication, but using a more secure encryption and/or authentication protocol for the former than the latter.

The operation of system 100 and source device 102 will be discussed in more detail in the sections below, according to various embodiments. While the below discussion refers at times to the components of the system 100 and source device 102, it is understood that the various aspects of the invention described herein may instead be implemented in other types of systems, devices and/or components.

II. Registration

In some embodiments, a number of different entities may pre-register with a data security service. As noted above, an "entity" may be any physical or virtual thing that can be directly or tangentially involved in a transaction (e.g., a company, institution, department or other organization, a person, a credit or debit card, a software application, a router, network switch or other network device, a firewall, etc.). The data security service may be provided by a particular company, and the process for registering a particular entity may include verifying or certifying that the entity is what it is purported to be, and assigning an identifier to the entity. The identifier may then be stored in registry 112 of central server 110 in FIG. 1, for example.

In some embodiments and scenarios, identifiers are assigned entirely by the data security service (e.g., by the central server 110). Alternatively, for some identifiers that do not change at a very high frequency (e.g., once a year, upon suspicion of identity theft, etc.), the identifiers may be manually selected by a person going through the registration process. For example, a person may select an identifier (or a set of identifiers) for himself or herself, and/or for a credit or debit card that he or she holds, etc. In some embodiments, the person may instead select a sequence of images, and the central server 110 may associate the image sequence to the identifier(s). The image sequence may be easier to remember than the full identifier(s), and therefore may be useful for authorization purposes (as discussed further below).

Security may be increased by automatically (and/or upon request) changing the values of the identifiers stored in the registry from time to time. In this manner, security levels may be tailored to the sensitivity or risk level of the data being protected. For example, an identifier associated with a financial institution or a "high security" network switch may be changed every two minutes (or every time an encoding device requests the identifier, etc.), while an identifier associated with a particular person or a general-purpose router may be changed on a monthly or annual basis (or only upon request, etc.). Identifiers may also be updated based on other triggers (e.g., security breaches), thereby allowing responses to security threats to be narrowly tailored based on the nature of the security threat. For example, the central server may update an identifier associated with a particular customer of an online retailer if a fraudulent transaction with that retailer occurred in the customer's name, and update the identifier associated with retailer itself if the retailer suspects a broader breach of its confidential records. In embodiments and scenarios where identifiers are manually changed, they may be changed using a secure administrative interface (e.g., provided by a computer terminal coupled to the central server 110, or made available to others via a secure communication channel, etc.), for example.

In some embodiments and scenarios, the frequency with which an identifier changes, and/or the amount of variance and/or randomization associated with each change, may be dictated by a current security level associated with the corresponding entity (e.g., a particular company). For example, an entity's identifier may be updated on a monthly basis if a "yellow" security level is associated with the entity, on a daily basis if the security level changes to "orange" (e.g., in response to general reports of increased hacking activity), and every five minutes if the security level changes to "red" (e.g., in response to a confirmed report of a specific security breach involving the entity).

III. Secure Data Entry

As noted above, in one aspect of the present invention, no information entered on a keypad—and no data corresponding to standard representations of such information (e.g., ASCII codes)—is collected, stored or transmitted. With reference to FIGS. 1 and 2, for example, the user may enter numbers and/or letters by making a series of key entries on the keypad 130, and the source device 102 may directly encode the key entries such that any stored and/or transmitted information cannot be traced or mapped back to the original key entries without knowledge of the proper, time-dependent decoding operations and their proper sequence.

Figure 3:
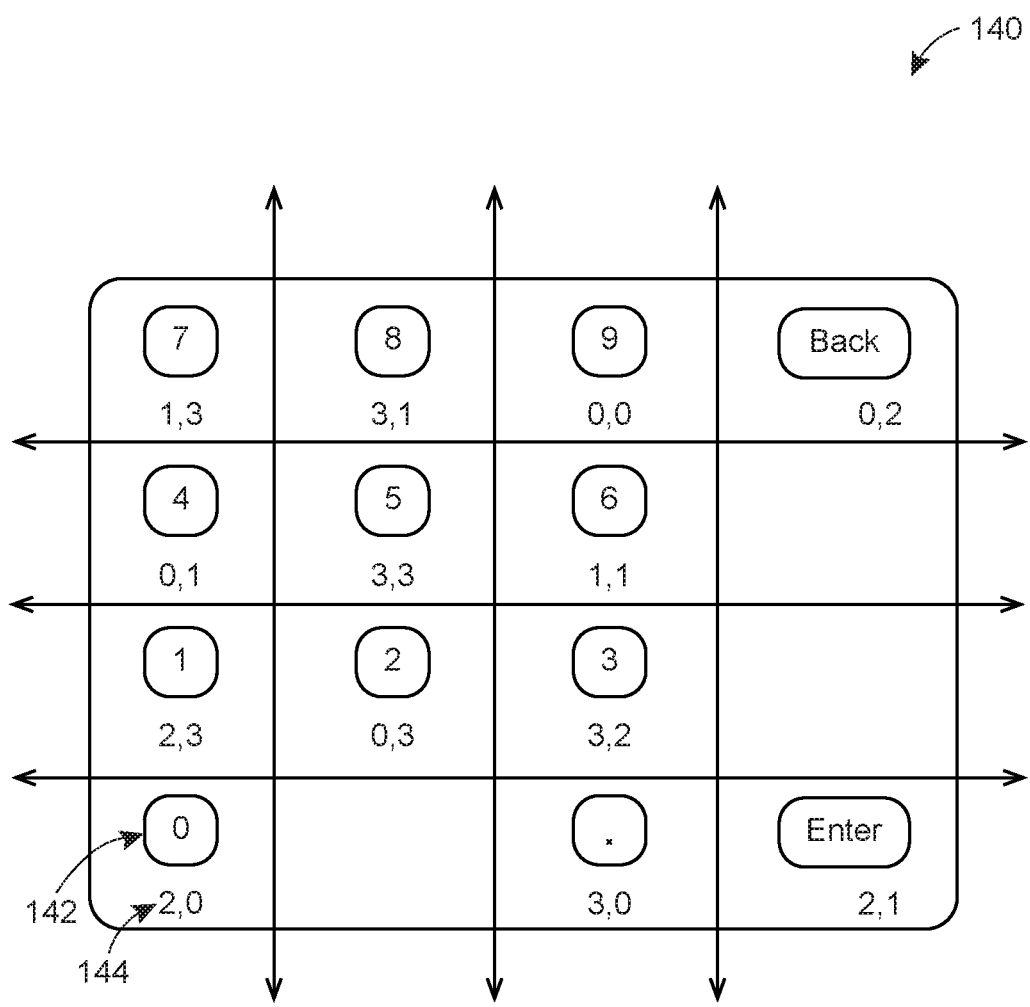
FIG. 3 depicts an example mapping that may be used to obfuscate key entry information, according to one embodiment and scenario.

FIG. 3 depicts an example mapping 140 that source device 102 may use to obfuscate key entry information, according to one embodiment and scenario. In the mapping 140, user entries made with keys 142 are mapped to virtual space coordinates 144. The keys 142 may be keys of keypad 130 in FIG. 2, for example. The mapping 140 corresponds to a specific value of a particular identifier. The identifier may be one that is associated (in registry 112) with the source device 102, an agent or other user entering information on the keypad 130, a company associated with the source device 102, or any other suitable entity, and the identifier value may have been provided to the source device 102 by the central server 110. Upon receiving the identifier value (e.g., via communication interface 126 and a secure communication channel), the processor 120 of source device 102 may utilize encoding module 128 to determine the mapping 140.

As seen in FIG. 3, in the example mapping 140, a user entry (e.g., press, touch, etc.) of "0" is mapped to the coordinates [2,0], a user entry of "1" is mapped to the coordinates [2,3], a user entry of the "Enter" key is mapped to the coordinates [2,1], and so on. Upon detecting a particular key entry, the encoding module 128 may generate a bit string representing the corresponding coordinates that result from the mapping 140. If a user enters "421" followed by the "Enter" key, for example, and if four bits are used to represent each coordinate pair, the encoding module 128 may generate the bit string 0001 0011 1000 1001 to represent the virtual space coordinate sequence [0,1], [0,3], [2,0], [2,1]. As noted above, however, the central server 110 may in some scenarios change the identifier at a very high frequency. For example, source device 102 may request an identifier from central server 110 immediately after each key entry, and the mapping 140 may change to a new mapping for each key entry in the example sequence above. Thus, for instance, an entry of "4" may map to [0,1] under the mapping 140, map to [1,2] (or another coordinate) under a mapping applied to a subsequent key press, etc.

While FIG. 3 illustrates an example in which the size of the virtual space roughly matches 1:1 the size of the keypad (in terms of the number discrete values), in other embodiments the virtual space may be much larger. For example, each of keys 142 may map to a different coordinate of a virtual grid that is 256×256, with the mapping changing for each identifier value. For instance, a key entry of "0" may map to the virtual space coordinate [163,24] for a first identifier/mapping, map to the virtual space coordinate [212,148] for the next identifier/mapping, etc. Generally, larger virtual spaces require longer bit representations of the resulting coordinates, but may provide enhanced randomization from the perspective of an unauthorized observer.

Figure 4:
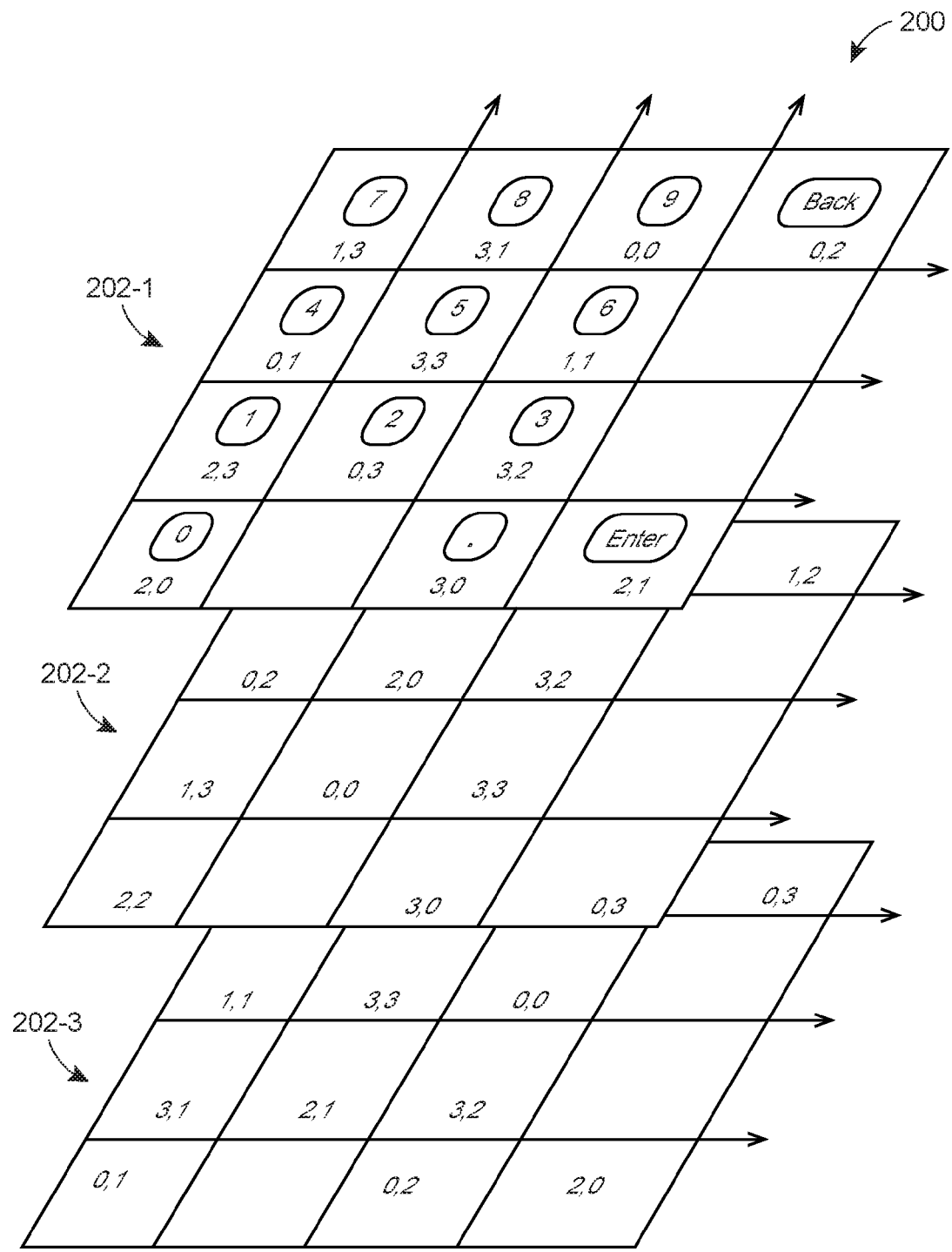
FIG. 4 depicts an example set of mapping layers that may be used to obfuscate key entry information, according to one embodiment and scenario.

Moreover, the source device 102 may implement additional mapping layers to further obfuscate and protect entered information. FIG. 4 depicts one such set 200 of mapping layers, according to one embodiment and scenario. In this example embodiment, the set 200 includes three mapping layers 202-1, 202-2 and 202-3, with the first mapping layer 202-1 applying the mapping 140 of FIG. 3 and the subsequent mapping layers 202-2 and 202-3 applying different mappings. As noted above, the mapping layer 202-1 may instead map key entries to a larger virtual space (e.g., 8×8, 16×16, 256×256, etc.). Similarly, mapping layer 202-2 may instead map the coordinates of layer 202-1 to a larger virtual space, and/or 202-3 may map the coordinates of layer 202-2 to a larger virtual space.

While FIG. 4 shows three layers 202-1 through 202-3, other embodiments may use any other suitable number of layers (e.g., two, five, 10, 100, etc.). Generally, more layers may be used where higher levels of security are desired. For example, transactions involving a financial institution may use 50 layers similar to layers 202, while transactions typically involving less sensitive information may only involve three layers, etc. In some embodiments, the source device 102 knows a priori how many layers of mapping/encoding will be applied. Alternatively, the central server 110 may inform the source device 102 of the number of layers (e.g., explicitly via an indication sent on the same secure communication channel used to send the identifier(s), or implicitly by sending only the required number of identifiers, etc.). In this latter embodiment, the number of layers may change from time to time (e.g., even between subsequent key entries).

IV. Data String Encoding in the Communication Path

The previous section describes one or multiple layers or stages of mapping/encoding within a single source device. More generally, however, different encoding stages may be implemented by different devices in a communication path. For example, a data string may be encoded by one or more encoding stages in source device 102 (e.g., stages corresponding to layers 202-1 through 202-3 of FIG. 4), and subsequently by one or more encoding stages in each of one or more network devices in network 106 (e.g., a router, a network switch, a server, etc.). Moreover, while the previous section describes the encoding of information corresponding to user entries on a keypad (e.g., keypad 130), a data string may instead correspond to or be based on virtually any other type of information. For example, a data string to be encoded and transmitted may include data that was automatically generated by a software application executing on a source device, or retrieved from a local memory of the source device, etc.

Figure 5:
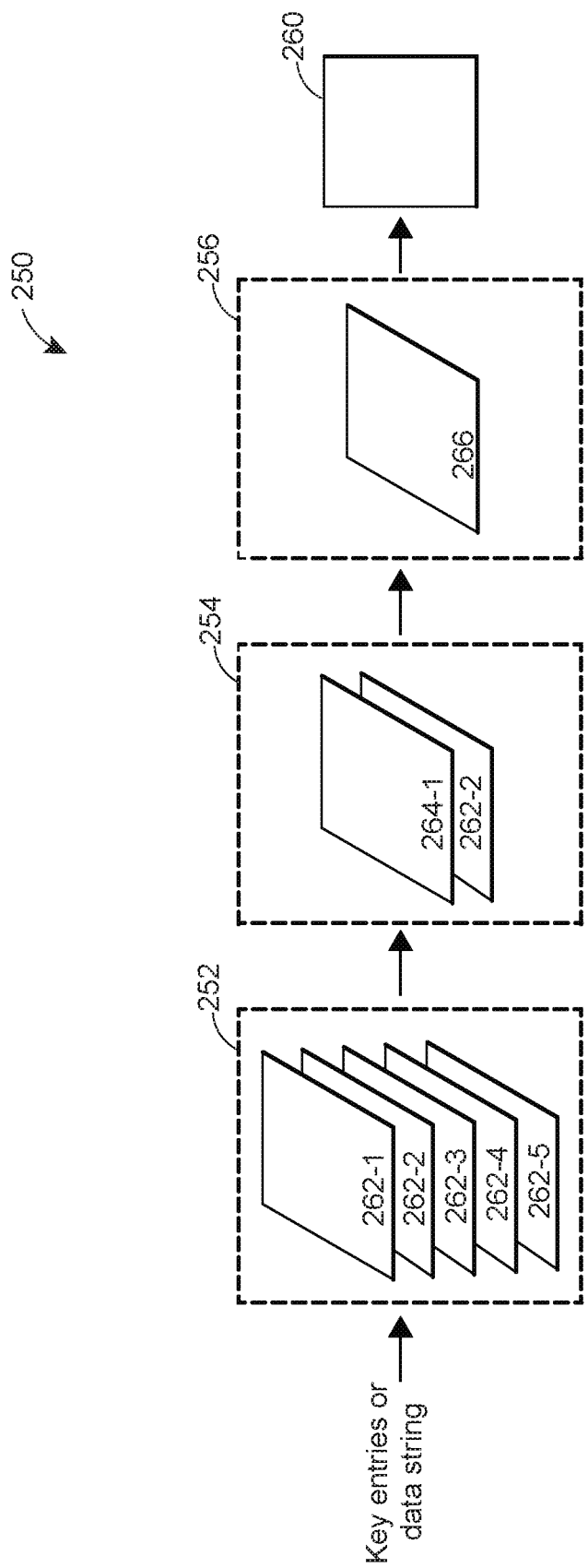
FIG. 5 depicts an example communication path for a data string in which the data string may be encoded, according to one embodiment.

FIG. 5 depicts an example communication path 250 for a data string in which the data string may be encoded using the techniques described herein, according to one embodiment and scenario. The communication path 250 includes a source device 252, a first network device 254, a second network device 256, and a destination device 260. The source device 252 may be similar to source device 102 of FIG. 1, the network devices 254 and 256 may be devices within network 106 of FIG. 1, and the destination device 250 may be similar to the destination device 104 of FIG. 1, for example. For instance, source device 252 may be a tablet device with a virtual keypad, network device 254 may be a router, network device 256 may be a network switch, and destination device 260 may be an enterprise server.

As seen in FIG. 5, the source device 252 includes five encoding stages 262-1 through 262-5, the network device 254 includes two encoding stages 264-1 and 264-2, and the second network device 256 includes one encoding stage 266. Each encoding stage may be implemented by one or more processors of the respective device when executing encoding module instructions stored in a memory of the respective device. In other embodiments, the communication path 250 may include more or fewer devices than are shown in FIG. 5, and/or some or all of the various devices may include more or fewer encoding stages. For example, the source device 252 may include tens or hundreds of encoding stages 262, and/or communication path 250 may include a number of additional network devices that do not include any encoding stages, etc.

In embodiments and scenarios where the data string being encoded is based on keypad entries, the first encoding stage 262-1 may map the key entries to bit sequences in the manner described in the previous section (i.e., bit sequences representing virtual space coordinates in a first layer, such as layer 202-1 of FIG. 4). The number of bits used to represent each virtual space coordinate may be viewed as the output block size for the encoding stage 262-1. From the foregoing and the following description, one of skill in the art will appreciate that the layers 202-1 through 202-3 of FIG. 4 may be viewed as one specific embodiment of the operation of encoding stages 262-1 through 262-3 of FIG. 5. In embodiments or scenarios where the data string is not based on keypad entries (e.g., data retrieved from a memory, etc.), the encoding stage 262-1 may operate in a manner similar to the subsequent encoding stages (e.g., 262-2, 262-3, etc.).

Each of the encoding stages 262-2 through 262-5, 264-1, 264-2 and 266 operates on the output of the previous encoding stage, and may be associated with an input block size ($X_l$ for the l-th encoding stage in the communication path 250) and a particular encoding algorithm or mapping that dictates the output block size ($Y_l$ for the l-th encoding stage in the communication path 250). In particular, each encoding stage may parse its input into blocks of $X_l$ bits, and apply the appropriate encoding algorithm to generate corresponding blocks of $Y_l$ bits. Generally, the output block size for a particular encoding stage may be the same as or larger than the input block size for that stage (though preferably not smaller, to prevent collisions).

The specific encoding algorithm used by each of encoding stages 262-1 through 262-5, 264-1, 264-2 and 266 may be dictated by the current value of a respective identifier, where the identifier is associated with a particular registered entity as discussed above. For example, the identifier for encoding stage 262-1 may be associated with the source device 252, the identifier for encoding stage 262-2 may be associated with a particular company (e.g., one that owns, maintains and/or uses the source device 252, or is otherwise involved with the transaction requiring transmission of the data string), the identifier for encoding stage 262-3 may be associated with a particular department of the company, the identifier for encoding stage 262-4 may be associated with a particular agent/employee using the source device 252, and the identifier for encoding stage 262-5 may be associated with a particular software application executing on the source device 252. Continuing with this example, the identifier for encoding stage 264-1 may be associated with the network device (e.g., router) 254, the identifier for encoding stage 264-2 may be associated with a firewall implemented by network device 254, and the identifier for encoding stage 266 may be associated with the network device (e.g., a network switch) 256.

Each of the devices 252, 254 and 256 may obtain the current values of its respective encoding stage identifier(s) by sending a request to a central server (e.g., central server 110 of FIG. 1) via a secure communication channel just prior to encoding. Alternatively, the identifier values may be periodically requested, or the central server may push current values of the appropriate identifiers to some or all of the devices 252, 254 and 256 (e.g., on a periodic basis) via secure communication channels. The secure communication channels between the central server and each device may use strong authentication/verification and encryption techniques known in the art, for example. In some embodiments, one or more of the devices 252, 254, 256 adds time stamp information to the transmitted data string at one or more intervals, to inform the destination device 260 of the time(s) at which the various identifier values were "current." This information may allow the destination device 260 to properly decode the received data string, as will be discussed further below. Moreover, in some embodiments, the current time or other information may be used by one or more of the devices 252, 254 and 256 to further encode or randomize the data string.

Each of devices 252, 254 and 256 may store a rule set that enables the device to determine the appropriate encoding algorithm to use, at each encoding stage implemented by the device, based on the current identifier value. In some embodiments, the input block size $X_l$ and output block size $Y_l$ may change for a particular encoding stage based on the current identifier value. In other embodiments, the input and/or output block sizes are constant, and the identifier values only dictate the current algorithm (e.g., mapping) to use for each encoding stage. Preferably, however, input and/or output block sizes may change with the identifier value in order to increase randomization from the perspective of an unauthorized observer. Moreover, at least some of the output block sizes $Y_l$ of the encoding stages within the communication path 250 preferably differ in order to increase the difficulty of unauthorized decoding. As a specific example, in one transmission (or for a portion thereof), $Y_1=8$ (i.e., encoding stage 262-1 has an output block size of eight bits), $Y_2=16$, $Y_3=4$, $Y_4=4$, $Y_5=32$, and so on.

For each encoding stage, the corresponding identifier may be constant throughout the transmission of a particular data string, or may change during the transmission. For example, encoding stage 262-3 may be configured based on the value of an identifier associated with a financial services company, or another company requiring very high security levels, and the identifier value (and thus, encoding operation) may change even over the course of transmitting a single data string.

V. Data String Decoding

In an embodiment, a device receiving a data string encoded using any of the above techniques (e.g., destination device 104 of FIG. 1 or destination device 260 of FIG. 5) decodes the data string by implementing a different decoding stage corresponding to each encoding stage. In particular, to properly decode the data string, the receiving device implements the decoding stages in the reverse of the order in which the corresponding encoding stages were applied. With reference to FIG. 5, for example, the destination device 260 (e.g., one or more processors within device 260, executing instructions of a decoding module stored in a memory of device 260) may first implement a decoding stage that is the inverse of encoding stage 266, second implement a decoding stage that is the inverse of encoding stage 264-2, third implement a decoding stage that is the inverse of encoding stage 264-1, fourth implement a decoding stage that is the inverse of encoding stage 262-5, and so on, until finally a decoding stage that is the inverse of encoding stage 262-1 is implemented (e.g., to determine the key entries made by a user, or the original data string).

To determine the appropriate algorithms to apply at each decoding stage, in an embodiment, the destination device 260 may obtain the identifier values that were used for the corresponding encoding stages from a central server via a secure communication channel (e.g., from central server 110, using authentication and/or encryption techniques similar to those used by devices 252, 254 and/or 256 when those devices obtained the identifier values for encoding purposes). The identifier values may be requested by destination device 260 upon receiving the data string, for example, or requested by (or pushed to) destination device 260 on a periodic or other basis.

In some embodiments, the identifier values obtained by destination device 260 may simply be the most recent values, under the assumption that the values likely have not changed since the data string was encoded. In other embodiments, and particularly those in which identifier values may change with high frequency (e.g., between each user key entry), one or more of the devices 252, 254 and 256 may include one or more time stamps within, or along with, the data string transmission. The destination device 260 may then forward the time stamp information to the central server, so that the central server may send to destination device 260 the identifier values corresponding to the times at which identifier values were sent to the encoding stages. To this end, the central server may store a history for each identifier value (e.g., a list of past values, along with the times at which those values were current).

Destination device 260 may store a rule set that enables the device 260 to determine the appropriate decoding algorithms to use based on the received identifier values. To undo the encoding performed by the l-th encoding stage, for example, the corresponding decoding stage of the destination device 260 may parse the data string (or the partially decoded data string from the previous decoding stage) into blocks of size $Y_l$ (i.e., the output block size for the l-th encoding stage), and decode each block to an output block of size $X_l$ (i.e., the input block size for the l-th encoding stage using the appropriate mapping).

In an embodiment, for the destination device 260 to properly and entirely decode the received data string, the device 260 must know, or learn, the sequence in which to perform the decoding stages corresponding to the encoding stages (i.e., the reverse of the order in which the corresponding encoding stages were applied). In one embodiment, the central server sends information indicative of the correct sequence to the destination device 260. In other embodiments, the destination device 260 knows a priori what the correct sequence is, and only needs to obtain the appropriate identifier values from the central server. In one such embodiment, the communication path (e.g., communication path 250) may be viewed as a "trusted system," and the correct sequence of decoding stages may act as a type of authentication. That is, if the destination device 260 implements the decoding stages in the proper order, and uses the appropriate identifier values from the central server, then a failure to decode the data string may indicate that the data string was not transmitted along an "approved" communication path.

In some scenarios, the destination device 260 may not fully decode the data string, and therefore may not perform decoding stages corresponding to some or all of the encoding stages. For example, a receiving party associated with destination device 260 may wish to store at least partially encoded versions of customer credit card numbers, rather than storing the card numbers in an easily ascertained format (e.g., ASCII representations), in order to avoid triggering Payment Card Industry Data Security Standard (PCI DSS) compliance obligations.

VI. Authorization

An additional layer of security may be provided by requiring authorization for a given transaction. For example, purchases using a credit or debit card may only be approved by a payment processor after the card user has authorized the purchase. For ease of explanation, the below discussion refers primarily to embodiments or scenarios in which a credit or debit card holder pre-registers in order to provide authorization. In other embodiments and/or scenarios, however, the process may be used for other individuals and/or in other types of transactions. For example, an agent of a company may pre-register in order to provide authorization/confirmation for transactions conducted on behalf of consumers, or for purely internal transactions (e.g., to authorize a particular request to retrieve or modify information in an enterprise database), etc.

To provide for user authorization, a person may pre-register himself or herself, and/or his or her card, with a central server (e.g., central server 110 of FIG. 1). The registration process may be similar to that described above in Section II, for example, with an identifier being assigned to each person and/or card that is registered.

In one embodiment, the person may select his or her personal (or card) identifier. Because the identifier may be a long string of numbers and/or other characters that is hard to memorize, the person may be given the option of selecting a specific sequence of images from among a limited set of images. To provide just a couple of examples, the registrant may be able to select any specific sequence of four playing card colors/suits (e.g., black diamond, red spade, red heart, red diamond), or any specific sequence of three playing card colors/suits/ranks (e.g., red three of clubs, black king of hearts, black jack of diamonds), etc.

Figure 6:
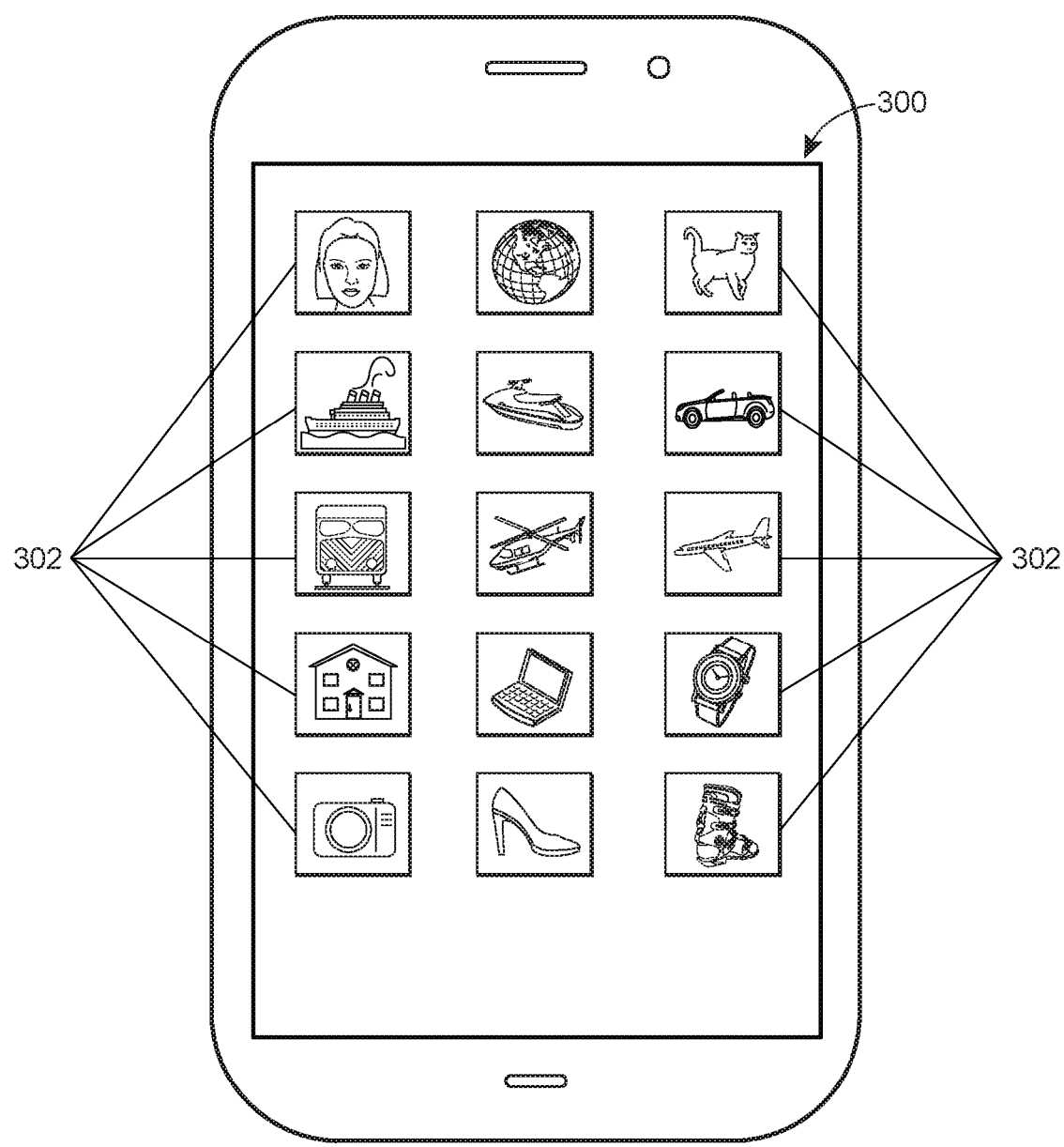
FIG. 6 depicts an example user interface that may be presented to a user for selecting an authorization code, according to one embodiment and scenario.

Another example is provided in FIG. 6, which shows an example user interface 300 with a number of essentially random/unrelated images 302. While FIG. 6 shows the user interface 300 being presented on a smartphone display screen, in other embodiments or scenarios other devices may be used. Moreover, while FIG. 6 shows a total of 12 images from which a selection may be made, other numbers of images are possible (e.g., 10, 20, 100, etc.). Each of the images 302 may correspond to a particular character string, such that the selected image sequence corresponds to an identifier consisting of a number of character strings in a particular order. In FIG. 6, for example, if the globe image corresponds to "3a7e16," the car image corresponds to "4b4a22," and the house image corresponds to "9u3c59," then the sequence "globe, car, house" may correspond to the identifier "3a7e164b4a229u3c59."

In some embodiments, the selected image sequence corresponds to multiple identifiers. For example, the sequence may correspond to a concatenation of a first identifier for the registrant himself/herself, and a second identifier for a credit or debit card of the registrant. As another example, a single image sequence may correspond to a pre-determined sequence of identifier values, with each update of the identifier by the central server causing the identifier value to progress to the next value in the sequence. The sequence of identifier values may be stored in a table of the central server, for example, or may be based on a mathematical function, etc. In this manner, at least some of the security benefits of changing the identifier from time to time may be maintained, without requiring that the individual memorize a new image sequence each time the identifier is updated.

The image sequence may be selected by accessing a user interface provided by the central server. In one embodiment, the registrant may call an agent of a company providing the data security service, and the agent may access a secure administrative interface to make the selections. For instance, the agent may inform the registrant of the image options, and then enter the selections as the registrant tells the agents those selections. In another embodiment, the registrant may remotely access the central server via a secure communication channel to make his or her selections. In this embodiment, the central server may send the registrant the collection of images that may be selected (e.g., for display via a user interface of a web browser or dedicated software application executing on the registrant's smartphone, tablet, laptop or desktop computer, etc.), and the registrant's selections may be transmitted back to the central server. The registrant may make the selections via a user interface similar to user interface 300 of FIG. 6, for example. In other embodiments, the registrant does not select an image sequence at all, but rather is informed of a sequence of images that corresponds to his or her randomly-assigned identifier.

In some embodiments, a registrant may also select the way(s) in which authorization requests are made. For example, the registrant may be provided with options for telephone authorization, email authorization, SMS text message authorization, and/or other types of authorization.

Once an image sequence has been established for a particular registrant (or his or her card), and the appropriate method(s) of authorization have been established for the registrant, the image sequence may be used to authorize future transactions. With reference to the communication path 250 of FIG. 5, for example, the destination device 260 may receive the encoded data string (e.g., as described above in Section III or IV), decode the data string (e.g., as described above in Section V), and determine from the decoded data that a particular person, or that person's credit or debit card, is associated with the transaction being performed. The destination device 260, or an agent associated with device 260, may then request the person's image sequence via the appropriate mechanism(s) (e.g., telephone call, SMS text message, etc.). Alternatively, the destination device 260 may use the secure communication channel to inform the central server that authorization is needed, and the central server may request the image sequence via the appropriate mechanism(s) and inform the destination device 260 as to whether a correct response was received.

In some embodiments and scenarios (e.g., if authorization is requested via telephone), a user may authorize a transaction by describing the image sequence to an agent (e.g., saying "globe, car, house"), and the agent can either enter that information, or simply approve the transaction directly if the agent is made aware of the appropriate sequence. In other embodiments and scenarios (e.g., if authorization is requested via a web browser or dedicated software application executing on the user's electronic device), the user may authorize a transaction by either typing in descriptors of the correct image sequence, or by selecting the correct sequence from among a plurality of images (e.g., via a user interface similar to user interface 300 of FIG. 6). Once the correct image sequence has been provided, the transaction may be approved. In some embodiments, if an incorrect image sequence is provided (or provided a threshold number of tries), the central server treats the incorrect entry or entries as a suspected security breach. For example, the central server may update an identifier associated with the person purportedly making the transaction, and/or update an identifier associated with that person's credit or debit card.

In some embodiments, the identifier(s) corresponding to the image sequence is/are also used in the encoding process discussed above in Section III or IV. For example, one of the encoding stages 262-1 through 262-5 in FIG. 5 may select an encoding algorithm based on a value of an identifier corresponding to the image sequence. In some such embodiments, this may require that the central server learn who is performing the transaction, or which card is being used to perform the transaction, so that the appropriate identifier may be retrieved and sent to source device 252. One example of such an embodiment is described below in Section VII, in connection with a particular use case/scenario.

VII. Example Use Case

Figure 7:
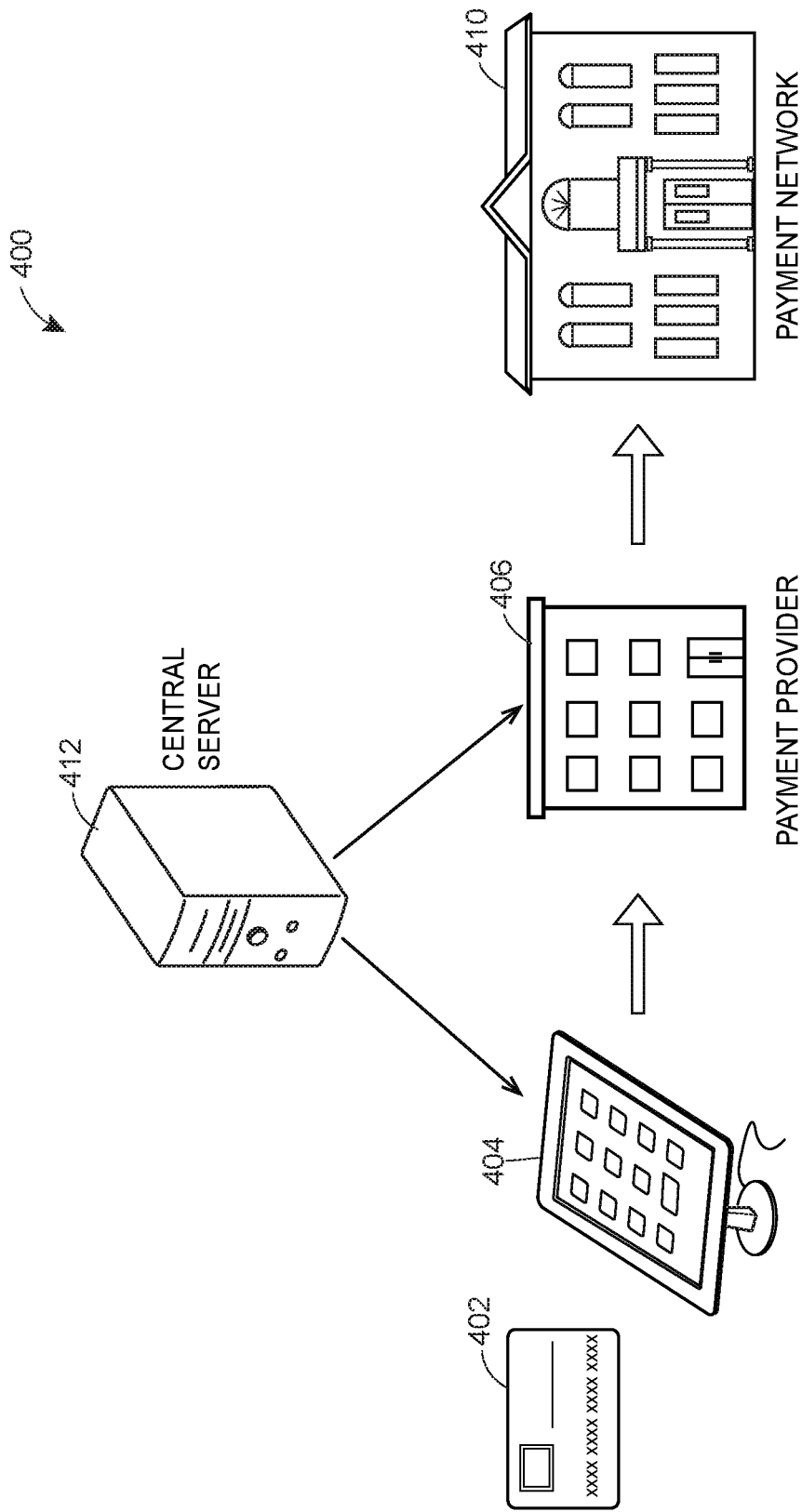
FIG. 7 depicts an example environment in which aspects of the present disclosure may be implemented when conducting a retail credit or debit card transaction, according to one embodiment and scenario.

FIG. 7 depicts an example environment 400 in which aspects of the present disclosure may be implemented when conducting a retail credit or debit card transaction, according to one embodiment and scenario. It is understood that this represents just one example use case, and that use cases relating to other types of transactions, and in other environments/systems, are also possible.

In the example scenario of FIG. 7, a consumer holds a credit or debit card 402 that is used to purchase goods at a retail store. Located at the retail store is a tablet device 404, which presents a user interface including a virtual keypad for entering purchase information (e.g., consumer card numbers) when transactions/purchases are made. Alternatively, device 404 may be a dedicated or general-purpose device with a hardware keypad. Payment information for transactions, including credit or debit card numbers, payment amounts, etc., may be sent to a payment provider 406 (e.g., one or more servers of payment provider 406), which forwards payment information to a payment network 410 (e.g., one or more servers of payment network 410) to add the appropriate amount to a credit card balance or deduct the appropriate amount from an account balance associated with a debit card, etc. The payment network 410 may be a bank, for example.

To obfuscate at least some of the payment information for the transaction, one or more of the techniques described above may be used. To this end, the example environment 400 includes a central server 412 (e.g., similar to central server 110 of FIG. 1), which may be in communication with the tablet device 404 and the payment provider 406 via respective, secure communication channels. Moreover, the tablet device 404 may have been pre-registered with the central server 412 in the manner described above in Section II. Other entities associated with the retail transactions may also, or instead, be pre-registered, such as the retail store itself, an employee/agent of the store, one or more network devices (e.g., routers) and/or applications or nodes (e.g., firewalls) in the communication path between the tablet device 404 and the payment provider 406, and so on.

In the example scenario described here, the card 402 is also pre-registered with central server 412. For example, the holder of card 402 may have registered the card 402 in part by selecting a specific image sequence, as discussed above in Section VI.

In operation, the holder of card 402 may either present his or her card to an employee of the store (a "card present" transaction) so that the employee can enter the card number on the virtual keypad of tablet 404, or provide his or card number to the employee over the telephone (a "card not present" transaction). Alternatively, the card holder may enter the card number using tablet 404.

In one embodiment, only a securely encoded version of the card number is present, in digital form, at any point within the transaction. For example, the techniques described above in connection with FIGS. 3 and 4 may be used to map the key entries to virtual space coordinates, with each mapping being dependent upon the value of a respective identifier value received from central server 412 via the secure communication channel. Moreover, one or more other devices (not shown in FIG. 7) within the communication path between tablet device 404 and payment provider 406 may each add one or more encoding stages, as described above in connection with FIG. 5.

In some embodiments, the current value of the identifier associated with card 402 is used for one encoding stage. For example, the holder of card 402 may provide his or her name to the store employee, and the employee may use tablet device 404 or another device to transmit the card holder's name to central server 412. The central server 412 may respond with a security question that was agreed upon at the time of the card holder's registration. The employee may then obtain the security question answer from the card holder, and provide the answer to the central server 412. The central server 412 may use the card holder's response to identify the card 402, and thereafter send the current value of the identifier corresponding to card 402 to the tablet device 404. The tablet device 404 may then use the identifier value to determine the appropriate encoding at one of the encoding stages, as discussed above. In other embodiments, other techniques may be used to inform the central server 412 of the identity of card 402.

After the tablet device 404, and any other encoding devices in the communication path, encodes a data string corresponding to payment information, the encoded data string is received at payment provider 406. As discussed above in Section V, the payment provider 406 may obtain the appropriate identifier values from the central server 412 via a secure communication channel, and use those values to decode the data string by reversing out each of the encoding stages in the correct order. To authorize the transaction, the payment provider 406 or the central server 412 may use the card holder's preferred authorization method to request the image sequence corresponding to the identifier for card 402 (e.g., according to any of the techniques discussed above in Section VI). If the card holder provides the proper sequence, the payment provider 406 may approve the transaction and forward the payment information to the payment network 410 via another secure communication channel. Because the payment information is never stored at tablet device 402 (or any other device of the retailer), the retailer may not need to comply with PCI DSS obligations.

VIII. Example Methods

Figure 8:
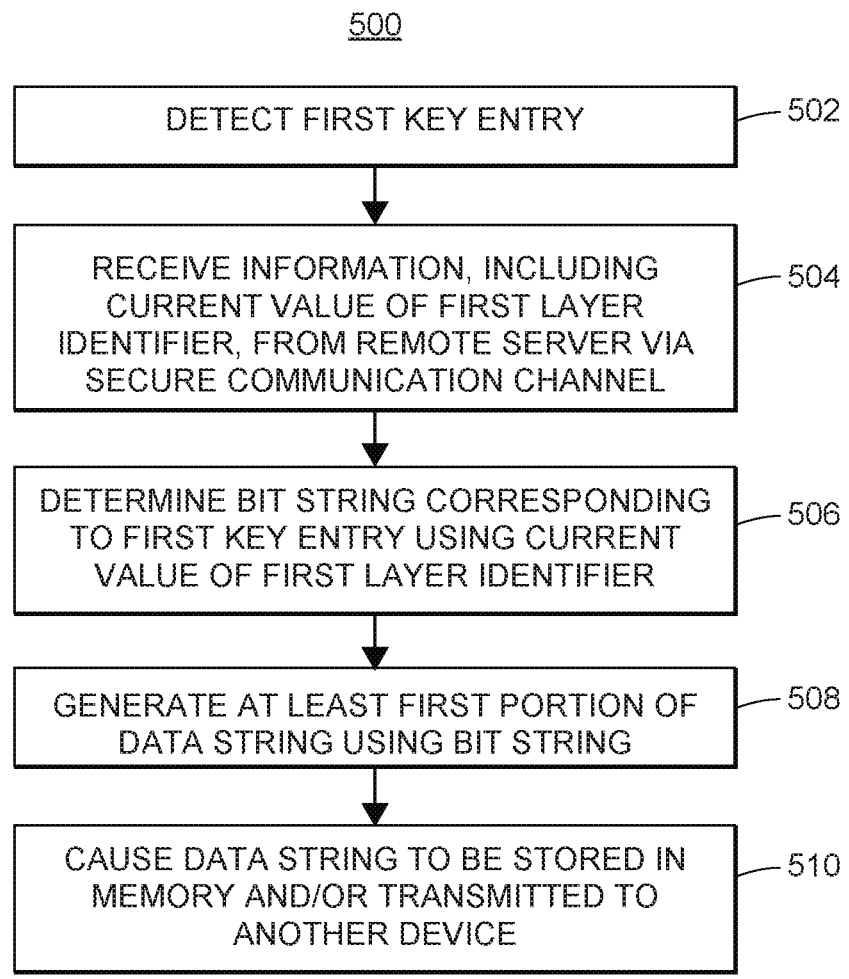
FIG. 8 is a flow diagram of an example method for securely collecting sensitive information, according to an embodiment.

FIG. 8 is a flow diagram of an example method 500 for securely collecting sensitive information, according to an embodiment. The method 500 may be implemented by one or more processors of an electronic device (e.g., processor 120 of FIG. 2, or one or more processors of source device 252 of FIG. 5 or tablet device 404 of FIG. 7), when executing instructions stored in a memory of the electronic device (e.g., memory 122 of FIG. 2), for example.

In the method 500, a first key entry is detected (block 502). The key entry is one that is made via a user interface of the electronic device, with the user interface including a plurality of keys. The key entry may be made during the process of manually entering sensitive information, such as a credit or debit card number, other financial information, personal health information, a social security number, etc. In some embodiments, the user interface (e.g., user interface 124 of FIG. 2) includes a hardware keypad, each key of the plurality of keys is a different key on the hardware keypad, and block 502 includes detecting which of the plurality of keys was touched or depressed. The electronic device may be a dedicated hardware keypad device, for example. In other embodiments, the user interface includes a virtual keypad presented on a touchscreen display of the electronic device, each key of the plurality of keys is a different key on the virtual keypad, and block 502 includes detecting which area of the touchscreen display was touched. The electronic device may be a smartphone, tablet, laptop computer or desktop computer, for example.

Also in the method 500, information is received from a remote server (block 504). The information is received from the remote server via a communication interface of the electronic device (e.g., communication interface 126 of FIG. 2), and via a secure communication channel to the remote server (e.g., in response to a request made by the electronic device). The remote server may be a server similar to central server 110 of FIG. 1 or central server 412 of FIG. 7, for example. Block 504 may occur before, simultaneously with, and/or after block 502.

The information received at block 504 includes at least a current value of a first layer identifier. The first layer identifier may be an identifier associated with an entity in a registry maintained by the remote server, for example. For instance, the entity may be the electronic device implementing the method 500, an organization (e.g., company, department, manufacturer, etc.) associated with the electronic device, a person associated with a transaction being made via the electronic device, etc. In some embodiments, the information received at block 504 also includes current values of one or more additional layer identifiers. The information may be received in a single transmission from the remote server, or over multiple transmissions.

A bit string corresponding to the first key entry may be determined using the current value of the first layer identifier (block 506). For example, the electronic device may use the current value to determine the appropriate encoding/mapping to use when encoding the key entry detected at block 502. Under one encoding/mapping, for instance, a key entry of "5" may be mapped to the bit string 01 11 (e.g., the virtual space coordinates [1,3]), a key entry of "g" may be mapped to the bit string 100 001 (e.g., the virtual space coordinates [4,1]), etc.

At least a first portion of a data string may be generated using the bit string determined at block 506 (block 508). The entire data string may correspond to a full card number, password, message or any other kind of information entered on the keypad. If the electronic device utilizes only a single mapping layer (e.g., as depicted in FIG. 3), block 506 may include generating the data string or data string portion directly from the bit string determined at block 506. Conversely, if the electronic device utilizes multiple mapping layers (e.g., as depicted in FIG. 4), and if the information received at block 504 included a current value for at least one additional layer identifier, block 506 may include additional operations. For example, at least a portion of the bit string determined at block 506 may be encoded according to a current value of a second layer identifier included in the received information. If more encoding layers exist, the bit string output by each layer may be encoded at the subsequent layer, using the encoding algorithm corresponding to the current value of the identifier for that subsequent layer. The data string, or data string portion, may then be equal to the output of the final encoding layer.

In some embodiments, the electronic device receives data indicating the number of encoding layers to be applied from the remote server via a secure communication channel (e.g., along with the other information received at block 504). The data may explicitly or implicitly indicate the number of layers (e.g., implicitly by sending only the required number of identifier values, in the correct order). In other embodiments, the electronic device knows the correct number of layers a priori.

The data string that is at least partially generated at block 508 may be caused to be stored in a local memory of the electronic device (e.g., memory 122 of FIG. 2), and/or transmitted to another device via a network (block 510). If transmitted, the destination device may be similar to destination device 104 or destination device 260, for example, and the network may be similar to network 106. Block 510 may be performed by directly storing and/or transmitting the data string, or by sending a control signal or message that causes another device or unit to perform the storage and/or transmission, for example.

Blocks 502 through 508 may be repeated for one or more subsequent key entries. In some embodiments where identifier values do not change frequently, block 504 may be omitted for these subsequent iterations. In other embodiments, however, block 504 is repeated on each (or at least some of) the subsequent iterations in order to obtain updated identifier values between some or all key entries. For example, the remote server may provide a new value of the first layer identifier (or for each of multiple layer identifiers, if needed) for each key entry. In either case, the data string that is caused to be stored and/or transmitted at block 510 may include multiple string segments/portions, each corresponding to a different one of the detected key entries.

Figure 9:
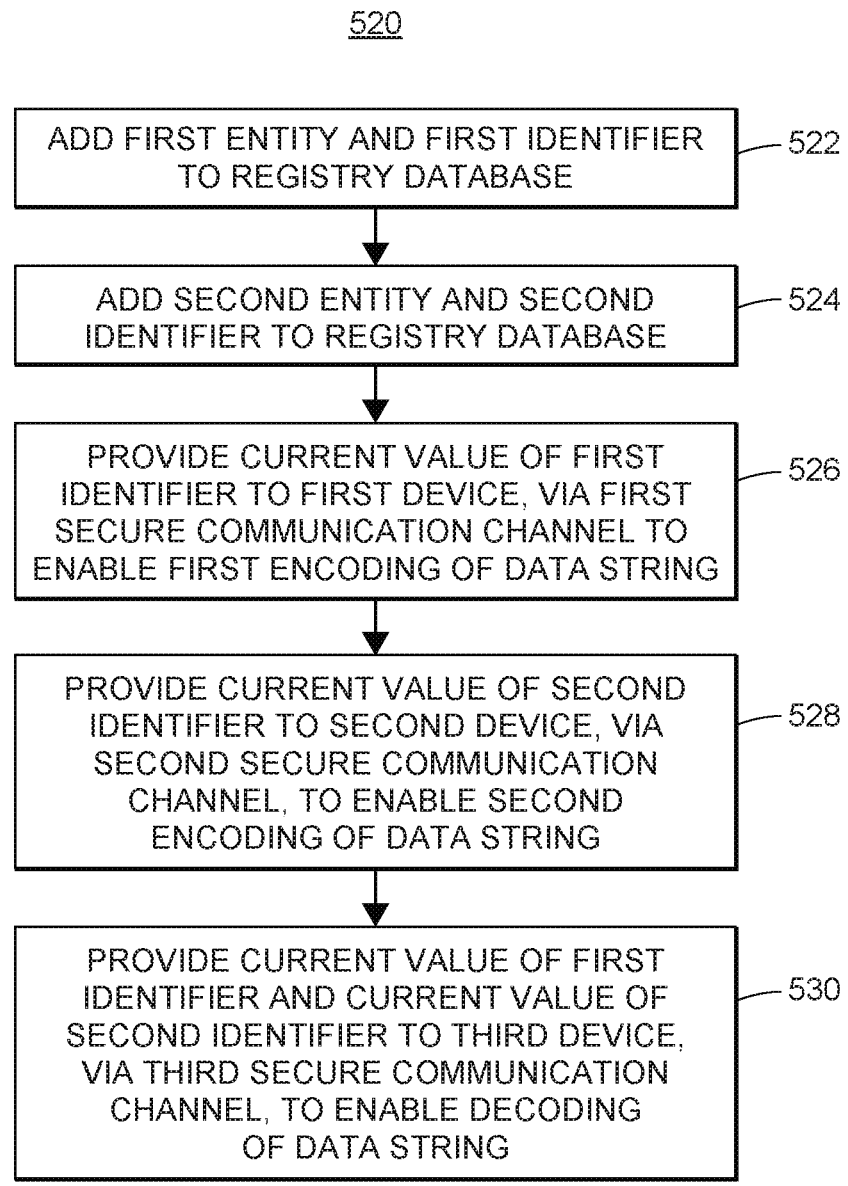
FIG. 9 is a flow diagram of an example method example method for providing secure communication of a data string along a communication path that includes a plurality of devices, according to an embodiment.

FIG. 9 is a flow diagram of an example method 520 for providing secure communication of a data string along a communication path that includes a plurality of devices, according to an embodiment. The data string may itself be an encoded version of one or more manual key entries, or may be some other type of uncoded or partially coded data (e.g., an ASCII representation of a social security number, personal health report, etc.), for example. The method 520 may be implemented by one or more processors of a server (e.g., central server 110 of FIG. 1, or central server 412 of FIG. 7), when executing instructions stored in a memory of the server, for example.

In the method 520, a first entity (e.g., a person, company, department, data entry device, etc.), and a first identifier associated with the first entity, are added to a registry database stored in a persistent memory of the server (block 522). A second entity (e.g., a company, department, network device, etc.), and a second identifier associated with the second entity, are also added to the registry database (block 524). The entities may be added after a registration process such as that described above in Section II, for example.

A current value of the first identifier is provided to a first device, of the devices in the communication path, via a first secure communication channel in order to enable a first encoding of the data string (block 526). The value may be provided in response to a request received from the first device, for example. The first device may be associated with the first entity in some way. For example, the first entity may be the first device itself, or may be a person or organization (e.g., company, department, etc.) that owns, controls and/or uses the first device, etc. The first encoding of the data string encodes a plurality of bit sequences in the data string as a first plurality of encoded bit sequences, each having a first block size (e.g., number of bits).

A current value of the second identifier is provided to a second device of the devices in the communication path, via a second secure communication channel, in order to enable a second encoding of the data string (block 528). The value may be provided in response to a request received from the second device, for example. The second device is downstream of the first device in the communication path, and may be associated with the second entity in some way. For example, the second entity may be the second device itself (e.g., a network device such as a router or network switch), or may be a firewall implemented by the second device, etc. The second encoding of the data string encodes the first plurality of encoded bit sequences as a second plurality of encoded bit sequences. Each of the second plurality of encoded bit sequences has a second block size, which may be different than the first block size for the first plurality of encoded bit sequences.

The current value of the first identifier and the current value of the second identifier are provided to a third device of the devices in the communication path, via a third secure communication channel, in order to enable decoding of the data string (block 530). The third device is downstream of the second device in the communication path. For example, the third device may be a temporary or final destination for the data string.

In some scenarios, the method 520 also includes blocks associated with the encoding and decoding of a subsequent data string. For example, the method 520 may include blocks in which new values are provided for the first and second identifiers at a later time when the subsequent data string is being encoded and transmitted. Depending on the time passed since the initial data string transmission, and the frequency with which each identifier value is updated by the server, one or both of the new values may differ from the values that had been provided for the earlier data string (at blocks 256 and 258).

In some embodiments and/or scenarios, the method 520 is modified such that the server provides the current values of both the first identifier and the second identifier to the first device (e.g., a source device), to enable the first device to perform the encoding stages dictated by both of those identifier values, rather than distributing the encoding across two devices. In still other embodiments and/or scenarios, the first and second (and possibly other) devices both implement encoding stages, and at least one of those devices implements multiple encoding stages.

Figure 10:
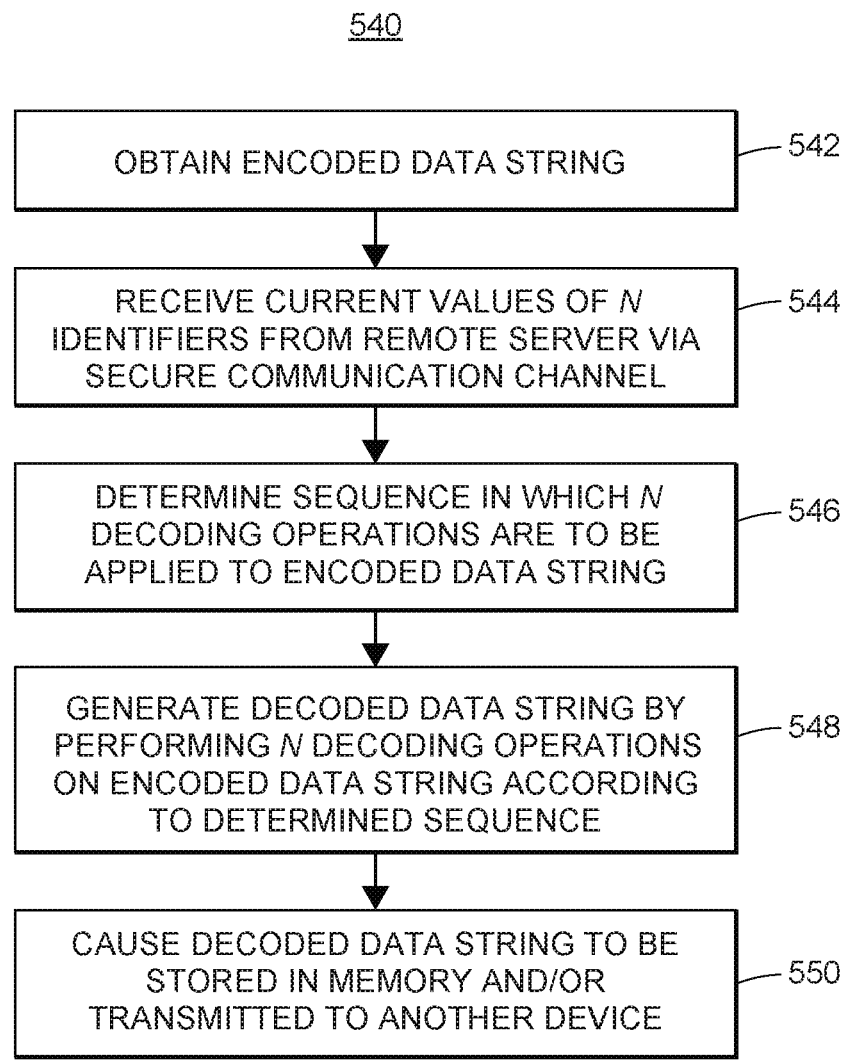
FIG. 10 is a flow diagram of an example method of decoding a securely transmitted data string, according to an embodiment.

FIG. 10 is a flow diagram of an example method 540 of decoding a securely transmitted data string, according to an embodiment. The method 540 may be implemented by one or more processors of an electronic device (e.g., one or more processors of destination device 104 of FIG. 1 or destination device 260 of FIG. 5), when executing instructions stored in a memory of the electronic device, for example.

In the method 540, an encoded data string is obtained (block 542). In one scenario, the encoded data string is obtained by receiving the encoded data string from a source device (e.g., after the data string is encoded using the method 500). In another scenario, the encoded data string is obtained by retrieving the encoded data string from a local memory of the electronic device. The encoded data string may represent sensitive or potentially sensitive information (e.g., a credit or debit card number or other financial information, personal health information, a social security number, etc.).

Current values of N identifiers (N≥1) are received from a remote server via a communication interface of the electronic device and a secure communication channel (block 544). Block 544 may occur before, simultaneously with, and/or after block 542. Each of the N identifiers is associated with a respective one of a plurality of entities, and each of those entities is associated with communication of the encoded data string. For example, one entity may be a keypad device that was used to manually enter information corresponding to the data string, one may be a person or organization involved in a transaction relating to the data string, one may be a network device or firewall in the communication path of the data string, etc. Moreover, each of the entities corresponds to a respective one of N decoding operations, where each of the N decoding operations operates on blocks of bits having a respective block size (e.g., number of bits). Some or all of the N decoding operations may use different block sizes.

A sequence in which the N decoding operations are to be applied to the encoded data string is determined (block 546). In one embodiment, the remote server provides data indicating the correct sequence. In another embodiment, the electronic device implementing the method 540 knows the correct sequence a priori, and determines the correct sequence by accessing rules or instructions stored in a local memory.

A decoded data string is generated by performing the N decoding operations on the encoded data string according to the sequence determined at block 546 (block 548). Block 548 may include, for each of the N decoding operations, parsing at least a portion of the encoded data string (or of a partially decoded data string resulting from a previous one of the N decoding operations) into blocks having the respective block size (i.e., the size corresponding to that particular decoding operation), separately decoding each of the blocks having the respective block size, and, for the first N−1 decoding operations, passing a string of the separately decoded blocks to the next one of the N decoding operations.

The decoded data string is caused to be stored in a local memory of the electronic device, and/or transmitted to another device (block 550). Block 550 may be performed by directly storing and/or transmitting the decoded data string, or by sending a control signal or message to another device or unit that performs the storage and/or transmission, for example.

IX. Aspects of the Invention

Although the foregoing text sets forth a detailed description of numerous different aspects and embodiments of the invention, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

Aspect 1: A method implemented in an electronic device having a user interface with a plurality of keys, a communication interface, a memory, and one or more processors, the method comprising: (i) detecting, by the one or more processors, a first key entry made via the user interface; (ii) receiving, by the one or more processors via the communication interface and a secure communication channel, first information from a remote server, the first information including at least a first current value of a first layer identifier; (iii) determining, by the one or more processors and using the first current value of the first layer identifier, a first bit string corresponding to the first key entry; (iv) generating, by the one or more processors and using the first bit string, at least a first portion of a data string; and (v) causing, by the one or more processors, the data string to be one or both of (a) stored in the memory and (b) transmitted to another device via a network.

Aspect 2. The method of aspect 1, wherein the user interface includes a hardware keypad, each key of the plurality of keys is a different key on the hardware keypad, and detecting the first key entry includes detecting which of the plurality of keys was touched or depressed.

Aspect 3. The method of aspect 1, wherein the user interface includes a virtual keypad presented on a touchscreen display of the electronic device, each key of the plurality of keys is a different key on the virtual keypad, and detecting the first key entry includes detecting which area of the touchscreen display was touched.

Aspect 4. The method of any one of aspects 1 through 3, further comprising requesting the first information from the remote server, wherein receiving the first information is in response to requesting the first information.

Aspect 5. The method of aspect 4, wherein requesting the first information is either (i) in response to detecting the first key entry, or (ii) prior to detecting the first key entry.

Aspect 6. The method of any one of aspects 1 through 5, wherein the first layer identifier is associated with an entity in a registry maintained by the remote server.

Aspect 7. The method of aspect 6, wherein the entity is one of (i) the electronic device; (ii) an organization associated with the electronic device; or (iii) a person associated with a transaction being made via the electronic device.

Aspect 8. The method of any one of aspects 1 through 7, wherein the first information further includes a first current value of a second layer identifier, and wherein generating at least a first portion of a data string using the first bit string includes: (i) encoding, using the first current value of the second layer identifier, at least a portion of the first bit string to generate a second bit string; and (ii) generating at least the first portion of the data string using the second bit string.

Aspect 9. The method of aspect 8, further comprising receiving, via the communication interface and a secure communication channel, data indicating a number of encoding layers to be applied by the electronic device.

Aspect 10. The method of any one of aspects 1 through 9, further comprising: (i) detecting, by the one or more processors, a second key entry made via the user interface; (ii) receiving, by the one or more processors via the communication interface and the secure communication channel, second information from the remote server, the second information including at least a second current value of the first layer identifier; (iii) determining, by the one or more processors and using the second current value of the first layer identifier, a second bit string corresponding to the second key entry; and (iv) generating, by the one or more processors and using the second bit string, at least a second portion of the data string.

Aspect 11. The method of aspect 10, wherein no key entry is made via the user interface between the first key entry and the second key entry.

Aspect 12. The method of aspect 10, wherein: (i) the first current value of the first layer identifier is associated with an entity in a registry maintained by the remote server at a first time; and (ii) the second current value of the first layer identifier is associated with the entity in the registry at a second time later than the first time.

Aspect 13. The method of aspect 12, wherein the entity is one of: (i) the electronic device; (ii) an organization associated with the electronic device; or (iii) a person associated with a transaction being made via the electronic device.

Aspect 14. The method of aspect 10, wherein: (i) the first information further includes a first current value of a second layer identifier; (ii) the second information further includes an second current value of the second layer identifier; (iii) generating at least the first portion of the data string using the first bit string includes (a) encoding, using the first current value of the second layer identifier, at least a portion of the first bit string to generate a third bit string, and (b) generating at least the first portion of the data string using the third bit string; and (iv) generating at least the second portion of the data string using the second bit string includes (a) encoding, using the second current value of the second layer identifier, at least a portion of the second bit string to generate a fourth bit string, and (b) generating at least the second portion of the data string using the fourth bit string.

Aspect 15. The method of aspect 14, further comprising: (i) requesting the first information from the remote server; and (ii) requesting the second information from the remote server, wherein receiving the first information is in response to requesting the first information, and wherein receiving the second information is in response to requesting the second information.

Aspect 16. An electronic device comprising: (i) a user interface including a plurality of keys; (ii) a communication interface; (iii) a memory; and (iv) one or more processors configured to (a) detect a first key entry made via the user interface, (b) receive first information from a remote server via the communication interface and a secure communication channel, the first information including at least a first current value of a first layer identifier, (c) determine, using the first current value of the first layer identifier, a first bit string corresponding to the first key entry, (d) generate at least a first portion of a data string using the first bit string, and (e) cause the data string to be stored in the memory and/or transmitted to another device via a network.

Aspect 17. The electronic device of aspect 16, wherein: (i) the user interface includes a physical keypad; (ii) each key of the plurality of keys is a different key on the hardware keypad; and (iii) the one or more processors are configured to detect the first key entry at least by detecting which of the plurality of keys was touched or depressed.

Aspect 18. The electronic device of aspect 16, wherein: (i) the user interface includes a virtual keypad presented on a touchscreen display of the electronic device; (ii) each key of the plurality of keys is a different key on the virtual keypad; and (iii) the one or more processors are configured to detect the first key entry at least by detecting which area of the touchscreen display was touched.

Aspect 19. The electronic device of any one of aspects 16 through 18, wherein the first information further includes a first current value of a second layer identifier, and wherein the one or more processors are configured to generate at least the first portion of the data string using the first bit string at least by: (i) encoding, using the first current value of the second layer identifier, at least a portion of the first bit string to generate a second bit string; and (ii) generating at least the first portion of the data string using the second bit string.

Aspect 20. The electronic device of any one of aspects 16 through 18, wherein the one or more processors are further configured to: (i) detect a second key entry made via the user interface; (ii) receive, via the communication interface and the secure communication channel, second information from the remote server, the second information including at least a second current value of the first layer identifier; (iii) determine, using the second current value of the first layer identifier, a second bit string corresponding to the second key entry; and (iv) generate, using the second bit string, at least a second portion of the data string.

Aspect 21. A method, implemented in a server that includes one or more processors and a memory storing a registry database, of providing secure communication of a data string along a communication path including a plurality of devices, the method comprising: (i) adding to the registry database a first entity and a first identifier associated with the first entity; (ii) adding to the registry database a second entity and a second identifier associated with the second entity; (iii) providing to a first device of the plurality of devices, via a first secure communication channel, a first current value of the first identifier to enable a first encoding of the data string, wherein the first device is associated with the first entity, and wherein the first encoding of the data string encodes a plurality of bit sequences in the data string as a first plurality of encoded bit sequences; (iv) providing to a second device of the plurality of devices, via a second secure communication channel, a first current value of the second identifier to enable a second encoding of the data string, wherein the second device is associated with the second entity and downstream of the first device in the communication path, and wherein the second encoding of the data string encodes the first plurality of encoded bit sequences as a second plurality of encoded bit sequences; and (v) providing to a third device of the plurality of devices, via a third secure communication channel, the first current value of the first identifier and the first current value of the second identifier to enable decoding of the data string, wherein the third device is downstream of the second device in the communication path.

Aspect 22. The method of aspect 21, wherein each of the first plurality of encoded bit sequences has a first block size, and each of the second plurality of encoded bit sequences has a second block size different than the first block size.

Aspect 23. The method of aspect 21 or 22, wherein the first entity is one of: (i) the first device; (ii) a person; or (iii) an organization.

Aspect 24. The method of any one of aspects 21 through 23, wherein the second device is a network device, and the second entity is one of: (i) the network device; or (ii) a firewall implemented by the second device.

Aspect 25. The method of any one of aspects 21 through 24, further comprising: (i) providing to the first device, via the first secure communication channel, a second current value of the first identifier to enable a first encoding of a subsequent data string, wherein the first encoding of the subsequent data string encodes a plurality of bit sequences in the subsequent data string as a third plurality of encoded bit sequences; (ii) providing to the second device, via the second secure communication channel, a second current value of the second identifier to enable a second encoding of the subsequent data string, wherein the second encoding of the subsequent data string encodes the third plurality of encoded bit sequences as a fourth plurality of encoded bit sequences; and (iii) providing to the third device, via the third secure communication channel, the second current value of the first identifier and the second current value of the second identifier to enable decoding of the subsequent data string, wherein one or both of (i) the second current value of the first identifier is different than the first current value of the first identifier, or (ii) the second current value of the second identifier is different than the first current value of the second identifier.

Aspect 26. The method of any one of aspects 21 through 25, wherein one or both of: (i) providing to the first device the first current value of the first identifier is in response to receiving a request from the first device; and (ii) providing to the second device the first current value of the second identifier is in response to receiving a request from the second device.

Aspect 27. A method, implemented in a server that includes one or more processors and a memory storing a registry database, of providing secure communication of a data string, the method comprising: (i) adding to the registry database a first entity and a first identifier associated with the first entity; (ii) adding to the registry database a second entity and a second identifier associated with the second entity; (iii) providing to a source device associated with the first entity and the second entity, via a first secure communication channel, both (a) a first current value of the first identifier to enable a first encoding of the data string, wherein the first encoding of the data string encodes a plurality of bit sequences in the data string as a first plurality of encoded bit sequences, and (b) a first current value of the second identifier to enable a second encoding of the data string, wherein the second encoding of data string encodes the first plurality of encoded bit sequences as a second plurality of encoded bit sequences; and (iv) providing to a destination device, via a second secure communication channel, the first current value of the first identifier and the first current value of the second identifier to enable decoding of the data string.

Aspect 28. The method of aspect 27, wherein each of the first plurality of encoded bit sequences has a first block size, and each of the second plurality of encoded bit sequences has a second block size different than the first block size.

Aspect 29. The method of aspect 27 or 28, wherein the first entity and the second entity are different ones of: (i) the source device; (ii) a person; or (iii) an organization.

Aspect 30. The method of any one of aspects 27 through 29, further comprising: (i) providing to the source device, via the first secure communication channel, both (a) a second current value of the first identifier to enable a first encoding of a subsequent data string, wherein the first encoding of the subsequent data string encodes a plurality of bit sequences in the subsequent data string as a third plurality of encoded bit sequences, and (b) a second current value of the second identifier to enable a second encoding of the subsequent data string, wherein the second encoding of the subsequent data string encodes the third plurality of encoded bit sequences as a fourth plurality of encoded bit sequences; and (ii) providing to the third device, via the third secure communication channel, the second current value of the first identifier and the second current value of the second identifier to enable decoding of the subsequent data string, wherein the second current value of the first identifier is different than the first current value of the first identifier and/or the second current value of the second identifier is different than the first current value of the second identifier.

Aspect 31. The method of any one of aspects 27 through 30, wherein providing to the first device one or both of (i) the first current value of the first identifier, and (ii) the first current value of the second identifier, is in response to receiving a request from the first device.

Aspect 32. A method, implemented in an electronic device having one or more processors, a communication interface, and a memory, the method comprising: (i) obtaining, by the one or more processors, an encoded data string; (ii) receiving, by the one or more processors via the communication interface and a secure communication channel, current values of N identifiers from a remote server, wherein each of the N identifiers (a) is associated with a respective one of a plurality of entities, each of the plurality of entities being associated with communication of the encoded data string, and (b) corresponds to a respective one of N decoding operations, each of the N decoding operations operating on blocks of bits having a respective block size, and N being an integer greater than 1; (iii) determining, by the one or more processors, a sequence in which the N decoding operations are to be applied to the encoded data string; (iv) generating, by the one or more processors, a decoded data string by performing the N decoding operations on the encoded data string according to the determined sequence, wherein performing the N decoding operations includes, for each decoding operation of the N decoding operations, (a) parsing at least a portion of the encoded data string, or at least a portion of a partially decoded data string resulting from a previous one of the N decoding operations, into blocks having the respective block size, (b) separately decoding each of the blocks having the respective block size, and (c) for the first N−1 decoding operations, passing a string of the separately decoded blocks to the next one of the N decoding operations; and (v) causing, by the one or more processors, the decoded data string to be one or both of (i) stored in the memory and (ii) transmitted to another device.

Aspect 33. The method of aspect 32, wherein obtaining the encoded data string includes receiving the encoded data string from another electronic device via a network.

Aspect 34. The method of aspect 32, wherein obtaining the encoded data string includes retrieving the encoded data string from the memory of the electronic device.

Aspect 35. The method of aspect any one of aspects 32 through 34, wherein determining the sequence in which the N decoding operations are to be applied to the encoded data string includes receiving, via the communication interface and the secure communication channel, an indication of the sequence.

Aspect 36. The method of any one of aspects 32 through 35, wherein the plurality of entities include two or more of: (i) another electronic device on which information corresponding to the encoded data string was manually entered; (ii) a person; (iii) an organization; (iv) a network device; or (v) a firewall.

Aspect 37. A server comprising: (i) a first memory storing a registry database; (ii) a second memory storing instructions; and (iii) one or more processors are configured to execute the instructions to (a) add to the registry database a first entity and a first identifier associated with the first entity, (b) add to the registry database a second entity and a second identifier associated with the second entity, (c) provide to a first device of a plurality of devices in a communication path for a data string, via a first secure communication channel, a first current value of the first identifier to enable a first encoding of the data string, wherein the first device is associated with the first entity, and wherein the first encoding of the data string encodes a plurality of bit sequences in the data string as a first plurality of encoded bit sequences, (d) provide to a second device of the plurality of devices, via a second secure communication channel, a first current value of the second identifier to enable a second encoding of the data string, wherein the second device is associated with the second entity and downstream of the first device in the communication path, and wherein the second encoding of the data string encodes the first plurality of encoded bit sequences as a second plurality of encoded bit sequences, and (e) provide to a third device of the plurality of devices, via a third secure communication channel, the first current value of the first identifier and the first current value of the second identifier to enable decoding of the data string, wherein the third device is downstream of the second device in the communication path.

Aspect 38. The server of aspect 37, wherein each of the first plurality of encoded bit sequences has a first block size, and each of the second plurality of encoded bit sequences has a second block size different than the first block size.

Aspect 39. The server of aspect 37 or 38, wherein the first entity is one of: (i) the first device; (ii) a person; or (iii) an organization.

Aspect 40. The server of any one of aspects 37 through 40, wherein the second device is a network device, and the second entity is one of: (i) the network device; or (ii) a firewall implemented by the second device.

X. Other Considerations

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example an embodiment, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In an embodiment, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. §112(f) unless traditional means-plus-function language is expressly recited, such as "means for" or "step for" language being explicitly recited in the claim(s).

The invention claimed is:

1. A method, implemented in a server that includes one or more processors and a memory storing a registry database, of providing secure communication of a data string along a communication path including a plurality of devices, the method comprising:

adding to the registry database a first entity and a first identifier associated with the first entity;

adding to the registry database a second entity and a second identifier associated with the second entity;

providing to a first device of the plurality of devices, via a first secure communication channel, a first current value of the first identifier to enable a first encoding of the data string, wherein the first device is associated with the first entity, and wherein the first encoding of the data string encodes a plurality of bit sequences in the data string as a first plurality of encoded bit sequences;

providing to a second device of the plurality of devices, via a second secure communication channel, a first current value of the second identifier to enable a second encoding of the data string, wherein the second device is associated with the second entity and downstream of the first device in the communication path, and wherein the second encoding of the data string encodes the first plurality of encoded bit sequences as a second plurality of encoded bit sequences; and providing to a third device of the plurality of devices, via a third secure communication channel, the first current value of the first identifier and the first current value of the second identifier to enable decoding of the data string, wherein the third device is downstream of the second device in the communication path.

2. The method of claim 1, wherein each of the first plurality of encoded bit sequences has a first block size, and each of the second plurality of encoded bit sequences has a second block size different than the first block size.

3. The method of claim 1, wherein the first entity is one of:
the first device;
a person; or
an organization.

4. The method of claim 1, wherein the second device is a network device, and the second entity is one of:
the network device; or
a firewall implemented by the second device.

5. The method of claim 1, further comprising:
providing to the first device, via the first secure communication channel, a second current value of the first identifier to enable a first encoding of a subsequent data string, wherein the first encoding of the subsequent data string encodes a plurality of bit sequences in the subsequent data string as a third plurality of encoded bit sequences;

providing to the second device, via the second secure communication channel, a second current value of the second identifier to enable a second encoding of the subsequent data string, wherein the second encoding of the subsequent data string encodes the third plurality of encoded bit sequences as a fourth plurality of encoded bit sequences; and providing to the third device, via the third secure communication channel, the second current value of the first identifier and the second current value of the second identifier to enable decoding of the subsequent data string, wherein one or both of (i) the second current value of the first identifier is different than the first current value of the first identifier, or (ii) the second current value of the second identifier is different than the first current value of the second identifier.

6. The method of claim 1, wherein one or both of:
providing to the first device the first current value of the first identifier is in response to receiving a request from the first device; and
providing to the second device the first current value of the second identifier is in response to receiving a request from the second device.

7. A method, implemented in a server that includes one or more processors and a memory storing a registry database, of providing secure communication of a data string, the method comprising:

adding to the registry database a first entity and a first identifier associated with the first entity;

adding to the registry database a second entity and a second identifier associated with the second entity;

providing to a source device associated with the first entity and the second entity, via a first secure communication channel, both a first current value of the first identifier to enable a first encoding of the data string, wherein the first encoding of the data string encodes a plurality of bit sequences in the data string as a first plurality of encoded bit sequences, and a first current value of the second identifier to enable a second encoding of the data string, wherein the second encoding of data string encodes the first plurality of encoded bit sequences as a second plurality of encoded bit sequences; and providing to a destination device, via a second secure communication channel, the first current value of the first identifier and the first current value of the second identifier to enable decoding of the data string.

8. The method of claim 7, wherein each of the first plurality of encoded bit sequences has a first block size, and each of the second plurality of encoded bit sequences has a second block size different than the first block size.

9. The method of claim 7, wherein the first entity and the second entity are different ones of:
the source device;
a person; or
an organization.

10. The method of claim 7, further comprising:
providing to the source device, via the first secure communication channel, both
a second current value of the first identifier to enable a first encoding of a subsequent data string, wherein the first encoding of the subsequent data string encodes a plurality of bit sequences in the subsequent data string as a third plurality of encoded bit sequences, and
a second current value of the second identifier to enable a second encoding of the subsequent data string, wherein the second encoding of the subsequent data string encodes the third plurality of encoded bit sequences as a fourth plurality of encoded bit sequences; and
providing to the third device, via the third secure communication channel, the second current value of the first identifier and the second current value of the second identifier to enable decoding of the subsequent data string,
wherein one or both of (i) the second current value of the first identifier is different than the first current value of the first identifier, or (ii) the second current value of the second identifier is different than the first current value of the second identifier.

11. The method of claim 7, wherein providing to the first device one or both of (i) the first current value of the first identifier, and (ii) the first current value of the second identifier, is in response to receiving a request from the first device.

12. A method, implemented in an electronic device having one or more processors, a communication interface, and a memory, the method comprising:
obtaining, by the one or more processors, an encoded data string;
receiving, by the one or more processors via the communication interface and a secure communication channel, current values of N identifiers from a remote server, wherein each of the N identifiers (i) is associated with a respective one of a plurality of entities, each of the plurality of entities being associated with communication of the encoded data string, and (ii) corresponds to a respective one of N decoding operations, each of the N decoding operations operating on blocks of bits having a respective block size, and N being an integer greater than 1;
determining, by the one or more processors, a sequence in which the N decoding operations are to be applied to the encoded data string;
generating, by the one or more processors, a decoded data string by performing the N decoding operations on the encoded data string according to the determined sequence, wherein performing the N decoding operations includes, for each decoding operation of the N decoding operations,
parsing at least a portion of the encoded data string, or at least a portion of a partially decoded data string resulting from a previous one of the N decoding operations, into blocks having the respective block size,
separately decoding each of the blocks having the respective block size, and
for the first N−1 decoding operations, passing a string of the separately decoded blocks to the next one of the N decoding operations; and
causing, by the one or more processors, the decoded data string to be one or both of (i) stored in the memory and (ii) transmitted to another device.

13. The method of claim 12, wherein obtaining the encoded data string includes receiving the encoded data string from another electronic device via a network.

14. The method of claim 12, wherein obtaining the encoded data string includes retrieving the encoded data string from the memory of the electronic device.

15. The method of claim 12, wherein determining the sequence in which the N decoding operations are to be applied to the encoded data string includes receiving, via the communication interface and the secure communication channel, an indication of the sequence.

16. The method of claim 12, wherein the plurality of entities include two or more of:
another electronic device on which information corresponding to the encoded data string was manually entered;
a person;
an organization;
a network device; or
a firewall.

17. A server comprising:
a first memory storing a registry database;
a second memory storing instructions; and
one or more processors are configured to execute the instructions to
add to the registry database a first entity and a first identifier associated with the first entity,
add to the registry database a second entity and a second identifier associated with the second entity,
provide to a first device of a plurality of devices in a communication path for a data string, via a first secure communication channel, a first current value of the first identifier to enable a first encoding of the data string, wherein the first device is associated with the first entity, and wherein the first encoding of the data string encodes a plurality of bit sequences in the data string as a first plurality of encoded bit sequences, provide to a second device of the plurality of devices, via a second secure communication channel, a first current value of the second identifier to enable a second encoding of the data string, wherein the second device is associated with the second entity and downstream of the first device in the communication path, and wherein the second encoding of the data string encodes the first plurality of encoded bit sequences as a second plurality of encoded bit sequences, and provide to a third device of the plurality of devices, via a third secure communication channel, the first current value of the first identifier and the first current value of the second identifier to enable decoding of the data string, wherein the third device is downstream of the second device in the communication path.

18. The server of claim 17, wherein each of the first plurality of encoded bit sequences has a first block size, and each of the second plurality of encoded bit sequences has a second block size different than the first block size.

19. The server of claim 17, wherein the first entity is one of:
 the first device;
 a person; or
 an organization.

20. The server of claim 17, wherein the second device is a network device, and the second entity is one of:
 the network device; or
 a firewall implemented by the second device.

* * * * *